(12) United States Patent
Ogawa et al.

(10) Patent No.: US 10,137,880 B2
(45) Date of Patent: Nov. 27, 2018

(54) CONTROL APPARATUS FOR HYBRID VEHICLE

(71) Applicant: TOYOTA JIDOSHA KABUSHIKI KAISHA, Toyota-shi (JP)

(72) Inventors: Yuki Ogawa, Toyota (JP); Haruki Oguri, Toyota (JP); Kosuke Yoshida, Nagakute (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/224,245

(22) Filed: Jul. 29, 2016

(65) Prior Publication Data
US 2017/0028981 A1 Feb. 2, 2017

(30) Foreign Application Priority Data
Jul. 30, 2015 (JP) .................................. 2015-151320

(51) Int. Cl.
*B60W 20/00* (2016.01)
*B60W 20/14* (2016.01)
(Continued)

(52) U.S. Cl.
CPC ............. *B60W 20/14* (2016.01); *B60K 6/445* (2013.01); *B60W 10/06* (2013.01); *B60W 10/08* (2013.01);
(Continued)

(58) Field of Classification Search
None
See application file for complete search history.

(56) References Cited

U.S. PATENT DOCUMENTS 5,778,326 A 7/1998 Moroto et al.
6,131,680 A 10/2000 Nii et al.
(Continued)

FOREIGN PATENT DOCUMENTS

CN 104284823 1/2015
EP 2 847 054 A1 3/2015
(Continued)

OTHER PUBLICATIONS

Office Action dated Jun. 16, 2017 in U.S. Appl. No. 15/215,272.
(Continued)

*Primary Examiner* — Jonathan M Dager
(74) *Attorney, Agent, or Firm* — Oblon, McClelland, Maier & Neustadt, L.L.P.

(57) ABSTRACT

A control apparatus for a hybrid vehicle determines a scheduled travel route. The control apparatus further determines a downhill section included in the scheduled travel route by using gradient information acquired for a road section at a time when the vehicle has traveled on the road section and using gradient information stored in a navigation database for a road section on which the vehicle travels for a first time. The control apparatus determines a section from a downhill control start point to an end point of the target downhill section as a downhill control section. The downhill control start point is a point located a predetermined first distance closer to the vehicle from a start point of the target downhill section. When the vehicle travels on the downhill control section, the control apparatus executes downhill control.

6 Claims, 9 Drawing Sheets

(51) Int. Cl.
  *B60W 10/06* (2006.01)
  *B60W 10/08* (2006.01)
  *B60W 10/26* (2006.01)
  *B60W 20/12* (2016.01)
  *B60W 30/18* (2012.01)
  *B60K 6/445* (2007.10)
  *B60W 50/00* (2006.01)

(52) U.S. Cl.
  CPC ............ *B60W 10/26* (2013.01); *B60W 20/12* (2016.01); *B60W 30/18009* (2013.01); *B60W 30/18127* (2013.01); *B60W 2050/0089* (2013.01); *B60W 2520/105* (2013.01); *B60W 2530/16* (2013.01); *B60W 2550/142* (2013.01); *B60W 2550/143* (2013.01); *B60W 2550/145* (2013.01); *B60W 2550/402* (2013.01); *B60W 2710/06* (2013.01); *B60W 2710/08* (2013.01); *B60W 2710/244* (2013.01); *B60Y 2200/92* (2013.01); *Y02T 10/6239* (2013.01); *Y02T 10/6286* (2013.01); *Y02T 10/7258* (2013.01)

(56) References Cited

U.S. PATENT DOCUMENTS

| | | | | |
|---|---|---|---|---|
| 7,360,615 | B2* | 4/2008 | Salman | B60K 6/52 180/65.265 |
| 7,610,124 | B2* | 10/2009 | Wakashiro | B60K 6/485 701/22 |
| 7,958,958 | B2* | 6/2011 | de la Torre Bueno | B60K 6/46 180/65.29 |
| 8,269,641 | B2* | 9/2012 | Bauman | H02J 7/14 180/65.29 |
| 8,571,748 | B2* | 10/2013 | Kluge | G01C 21/3469 180/271 |
| 8,670,885 | B2* | 3/2014 | Gilman | B60W 50/0097 340/425.5 |
| 9,067,589 | B1* | 6/2015 | Zhao | B60W 20/104 |
| 9,266,443 | B2* | 2/2016 | Payne | B60L 11/1861 |
| 9,266,529 | B2* | 2/2016 | Dufford | B60W 20/40 |
| 9,290,108 | B2* | 3/2016 | Payne | B60L 11/1874 |
| 9,327,712 | B2* | 5/2016 | Matthews | B60W 20/00 |
| 9,527,399 | B2* | 12/2016 | Kim | B60L 11/1862 |
| 9,637,116 | B2* | 5/2017 | Miyazaki | B60W 20/50 |
| 9,701,302 | B2* | 7/2017 | Matsunaga | G01C 21/3469 |
| 9,702,718 | B2* | 7/2017 | Payne | G01C 21/3469 |
| 9,714,024 | B2* | 7/2017 | Yoon | B60K 6/547 |
| 9,796,370 | B2* | 10/2017 | Debert | B60W 10/06 |
| 9,816,474 | B2* | 11/2017 | Khafagy | F02N 11/0833 |
| 9,821,791 | B2* | 11/2017 | Dextreit | B60W 50/0097 |
| 9,878,631 | B2* | 1/2018 | Hyde | B60L 11/1861 |
| 9,896,086 | B2* | 2/2018 | Ogawa | B60L 11/1862 |
| 9,969,271 | B2* | 5/2018 | Ogawa | B60L 7/20 |
| 2007/0294026 | A1* | 12/2007 | Schirmer | B60W 10/06 701/533 |
| 2008/0119982 | A1* | 5/2008 | Yamada | B60L 3/12 701/33.4 |
| 2008/0243331 | A1* | 10/2008 | Kato | B60L 11/123 701/29.5 |
| 2008/0262668 | A1* | 10/2008 | Yamada | B60K 6/46 701/22 |
| 2008/0319596 | A1* | 12/2008 | Yamada | B60K 6/442 701/22 |
| 2008/0319597 | A1* | 12/2008 | Yamada | B60K 6/46 701/22 |
| 2010/0049397 | A1* | 2/2010 | Liu | G01C 21/3469 701/31.4 |
| 2010/0121514 | A1* | 5/2010 | Kato | B60K 6/48 701/22 |
| 2010/0179714 | A1* | 7/2010 | Tani | B60K 6/365 701/22 |
| 2010/0185384 | A1* | 7/2010 | Naito | G01C 21/26 701/532 |
| 2010/0241297 | A1 | 9/2010 | Aoki et al. | |
| 2010/0305799 | A1* | 12/2010 | Yamada | B60K 6/46 701/22 |
| 2010/0324752 | A1* | 12/2010 | Suganuma | B60W 40/076 701/1 |
| 2011/0022255 | A1* | 1/2011 | Yamada | B60K 6/46 701/22 |
| 2011/0066310 | A1* | 3/2011 | Sakai | B60L 1/00 701/22 |
| 2011/0184600 | A1* | 7/2011 | Kristinsson | G01C 21/3469 701/22 |
| 2011/0288712 | A1* | 11/2011 | Wang | B60K 6/445 701/22 |
| 2011/0288737 | A1* | 11/2011 | Carr | B60W 30/182 701/99 |
| 2012/0010767 | A1* | 1/2012 | Phillips | G01C 21/3469 701/22 |
| 2012/0032637 | A1* | 2/2012 | Kotooka | B60K 6/46 320/109 |
| 2012/0035795 | A1* | 2/2012 | Yu | B60W 50/0097 701/22 |
| 2012/0323413 | A1* | 12/2012 | Kedar-Dongarkar | B60K 6/442 701/22 |
| 2013/0015860 | A1* | 1/2013 | Crombez | G01R 31/36 324/433 |
| 2013/0024055 | A1* | 1/2013 | Hysko, Jr. | B60W 50/0097 701/22 |
| 2013/0030694 | A1* | 1/2013 | Nortrup | G01C 21/3667 701/410 |
| 2013/0116870 | A1* | 5/2013 | Harty | B60W 10/06 701/22 |
| 2013/0131892 | A1* | 5/2013 | Hashimoto | G01C 21/3469 701/1 |
| 2013/0274952 | A1* | 10/2013 | Weslati | B60W 50/0097 701/1 |
| 2013/0296102 | A1 | 11/2013 | Banker et al. | |
| 2014/0046518 | A1* | 2/2014 | Roos | B60W 30/182 701/22 |
| 2014/0121868 | A1* | 5/2014 | Zhang | B60W 10/04 701/22 |
| 2014/0288742 | A1* | 9/2014 | Hokoi | B60W 20/40 701/22 |
| 2015/0019057 | A1 | 1/2015 | Morisaki et al. | |
| 2015/0039169 | A1* | 2/2015 | Dextreit | B60W 50/0097 701/22 |
| 2015/0066270 | A1* | 3/2015 | Ogawa | B60W 20/00 701/22 |
| 2015/0066271 | A1* | 3/2015 | Ogawa | B60L 7/14 701/22 |
| 2015/0073637 | A1 | 3/2015 | Lennevi et al. | |
| 2015/0097512 | A1* | 4/2015 | Li | B60L 11/182 320/101 |
| 2015/0239365 | A1* | 8/2015 | Hyde | B60L 11/1861 701/2 |
| 2015/0275787 | A1* | 10/2015 | Dufford | F02D 29/02 701/102 |
| 2015/0275788 | A1* | 10/2015 | Dufford | F02D 29/02 701/102 |
| 2016/0082947 | A1* | 3/2016 | Naumann | G01C 21/3469 701/22 |
| 2016/0167641 | A1* | 6/2016 | Yoon | B60W 20/13 701/22 |
| 2016/0221567 | A1* | 8/2016 | Ogawa | B60W 20/40 |
| 2016/0221568 | A1* | 8/2016 | Ogawa | B60W 50/0097 |
| 2016/0229389 | A1* | 8/2016 | Hirano | B60L 11/1862 |
| 2016/0245662 | A1* | 8/2016 | Rajagopalan | G01C 21/3469 |
| 2016/0325637 | A1* | 11/2016 | Payne | G01C 21/3469 |
| 2016/0368481 | A1 | 12/2016 | Nuber et al. | |
| 2616/0368481 | | 12/2016 | Nuber et al. | |
| 2017/0021730 | A1* | 1/2017 | Ogawa | B60L 7/20 |
| 2017/0021820 | A1* | 1/2017 | Ogawa | B60L 11/1861 |
| 2017/0021821 | A1* | 1/2017 | Ogawa | B60W 10/06 |
| 2017/0021823 | A1 | 1/2017 | Ogawa | |
| 2017/0028980 | A1* | 2/2017 | Ogawa | B60K 6/445 |
| 2017/0028981 | A1* | 2/2017 | Ogawa | B60K 6/445 |

(56) References Cited

U.S. PATENT DOCUMENTS

| | | | |
|---|---|---|---|
| 2017/0088117 A1* | 3/2017 | Ogawa | B60W 10/08 |
| 2017/0355358 A1* | 12/2017 | Ogawa | B60L 11/14 |
| 2018/0134274 A1* | 5/2018 | Ogawa | B60W 20/12 |

FOREIGN PATENT DOCUMENTS

| | | |
|---|---|---|
| JP | 09308012 A | 11/1997 |
| JP | 2003-009310 | 1/2003 |
| JP | 2004-248455 | 9/2004 |
| JP | 2005-160269 A | 6/2005 |
| JP | 2007-223404 | 9/2007 |
| JP | 2009-126450 A | 6/2009 |
| JP | 2010-8218 | 1/2010 |
| JP | 2011-6047 A | 1/2011 |
| JP | 2013-119317 | 6/2013 |
| JP | 2013-154715 A | 8/2013 |
| JP | 2013-154718 A | 8/2013 |
| JP | 2013-154720 A | 8/2013 |
| JP | 2014-024487 A | 2/2014 |
| JP | 2015-19521 | 1/2015 |
| JP | 2015-73420 | 4/2015 |
| WO | WO 2009/118624 A1 | 10/2009 |

OTHER PUBLICATIONS

Office Action dated Jan. 9, 2018 in U.S. Appl. No. 15/219,927.
Notice of Allowance dated Dec. 26, 2017, issued in U.S. Appl. No. 15/215,272.
Corrected Notice of Allowance dated Mar. 27, 2018, issued in U.S. Appl. No. 15/215,272.
Notice of Allowance dated May 2, 2018, issued in U.S. Appl. No. 15/215,272.
Notice of Allowance dated Jun. 14, 2018, issued in U.S. Appl. No. 15/215,272.
Notice of Allowance dated Jul. 18, 2018, issued in U.S. Appl. No. 15/215,272.
U.S. Office Action dated Jul. 5, 2018, issued in U.S. Appl. No. 15/219,927.

\* cited by examiner

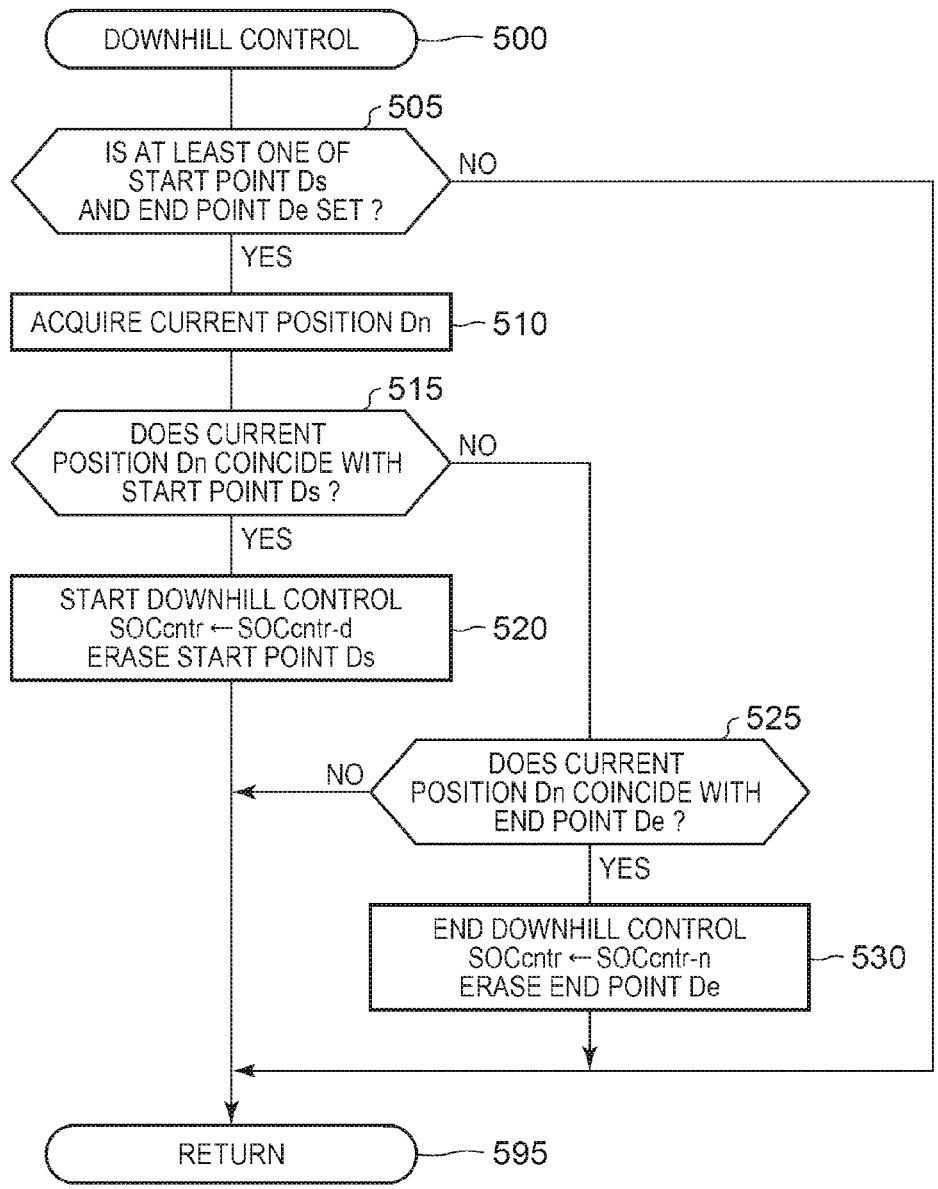

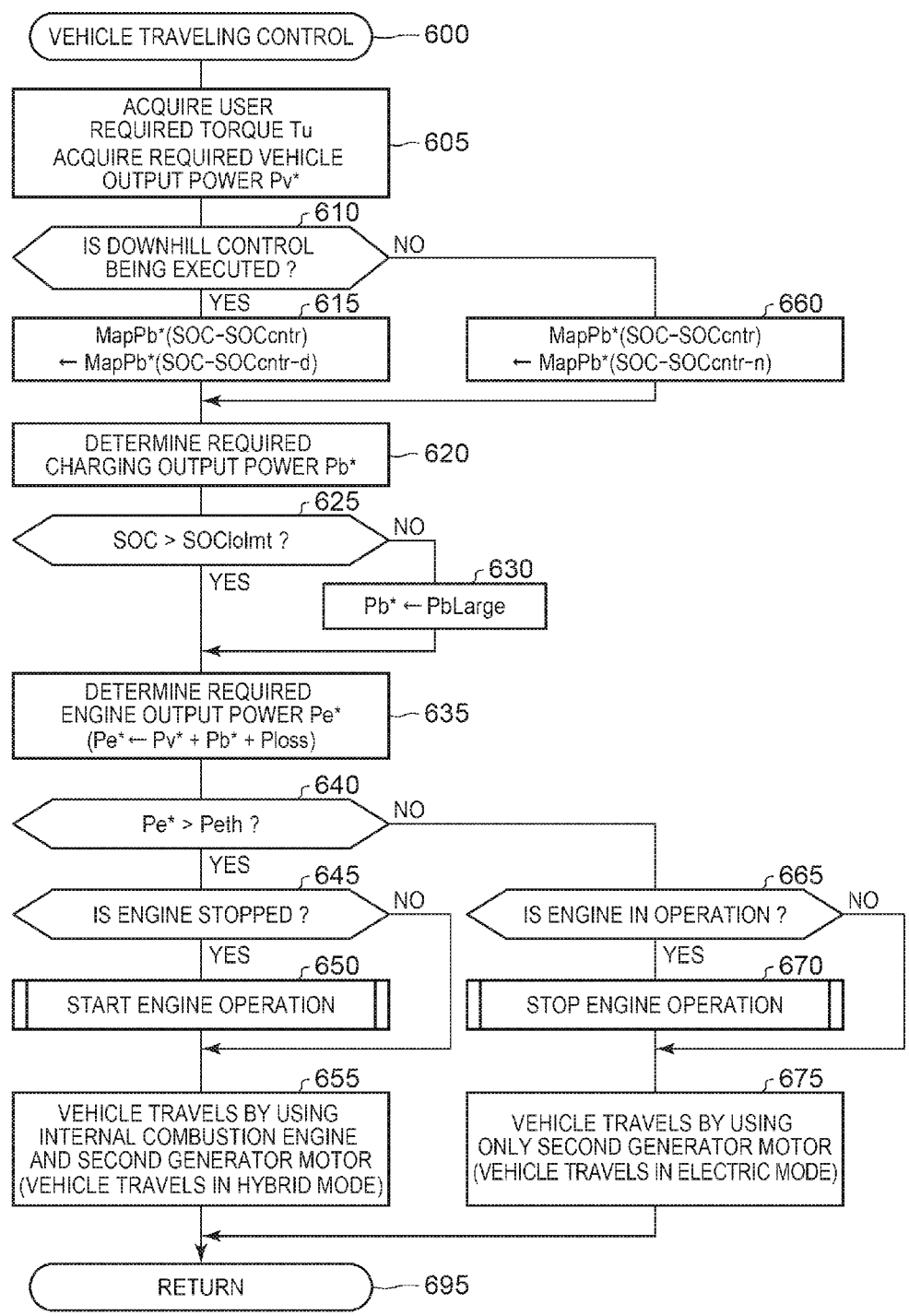

CONTROL APPARATUS FOR HYBRID VEHICLE

CROSS-REFERENCE TO RELATED APPLICATIONS

This application is based upon and claims the benefit of priority from Japanese Patent Application No. 2015-151320, filed on Jul. 30, 2015, the entire contents of which are incorporated herein by reference in entirety.

BACKGROUND OF THE DISCLOSURE

1. Field of the Disclosure

The present application relates to a control apparatus for a hybrid vehicle including an internal combustion engine, an electric motor and a storage battery that supplies electric power to the electric motor.

2. Description of Related Art

Conventionally, a hybrid vehicle (hereinafter, also simply referred to as vehicle) travels while controlling an electric motor and an internal combustion engine such that the capacity of a chargeable and dischargeable storage battery is efficiently utilized for the purpose of improvement in the fuel consumption performance of the vehicle.

On the other hand, a repetitive change in an extremely large remaining amount of charge (hereinafter, also simply referred to as state of charge (SOC)) or extremely small remaining amount of charge of the storage battery accelerates the performance degradation of the storage battery. Therefore, the SOC of the storage battery is managed for the purpose of preventing the degradation of the storage battery. Specifically, the upper limit and lower limit of the SOC are prescribed, and a control apparatus manages the SOC such that the SOC does not go beyond the range (referred to as management range) between the upper limit and the lower limit.

That is, the control apparatus prohibits charging the storage battery when the SOC reaches the upper limit. At this time, electric energy that is generated as a result of regenerative braking is transformed into thermal energy in a friction brake device or an inverter or both, or the like, so energy originally recoverable and usable for propelling the vehicle is consumed uselessly. In contrast, when the SOC reaches the lower limit, the control apparatus forcibly charges the storage battery by using the output power of the internal combustion engine. As a result, fuel is consumed due to a cause other than propelling the vehicle. Therefore, causing the SOC not to reach the upper limit or the lower limit during traveling of the vehicle leads to effective improvement in the fuel consumption performance of the vehicle.

Incidentally, when the vehicle travels on such a downhill that the vehicle accelerates without using the torque (driving force) of the internal combustion engine or the electric motor, braking force is required from the vehicle when a driver releases the foot from an accelerator pedal or possibly further depresses a brake pedal. At this time, an increase in vehicle speed is reduced or prevented by the regenerative braking force of the electric motor, and electric power (regenerative energy) generated as a result of regenerative braking is supplied to the storage battery. As a result, the SOC of the storage battery increases.

Therefore, when the vehicle travels on a long downhill (that is, a section having a relatively long distance and a relatively large altitude difference), the SOC may reach the upper limit halfway on the downhill, and the SOC cannot be increased any more. This means that the effect of improvement in fuel consumption, which is obtained as a result of traveling on a downhill, increases as the difference between the upper limit of the SOC and the SOC at the start point of the downhill increases.

One of existing control apparatuses for a vehicle (hereinafter, referred to as existing apparatus) acquires the position of the vehicle, a destination, map information (road information), and the like, with the use of a navigation system, and determines a scheduled travel route and a down-grade section (downhill section) in the scheduled travel route on the basis of those pieces of information. The existing apparatus estimates the amount of electric power that is newly chargeable into the storage battery through regenerative braking in a period during which the vehicle travels on the determined down-grade section. When the estimated amount of chargeable electric power is larger than an ordinary management range, the existing apparatus expands the management range of the storage battery to an expanded management range. In addition, the existing apparatus controls the electric motor or the internal combustion engine or both such that the SOC of the storage battery is consumed to the lower limit of the expanded management range by the time the vehicle starts traveling on the down-grade section. Hereinafter, such control is referred to as support control.

Usually, map information (particularly, for example, information pertaining to the altitudes of the start point and end point of each road section or the gradient of each road section) that is stored in a navigation database of the navigation system is created on the basis of actual terrain data measured in advance. Therefore, there is a case where the altitude (or gradient) of a road on which the vehicle actually travels does not coincide with the altitude (or gradient) stored in the navigation database. For example, in the case of a road inside a tunnel, the actual altitude of the road is lower than the altitude stored in the navigation database. In the case of a road on bridge girders, the actual altitude of the road is higher than the altitude stored in the navigation database.

Thus, for example, even when a road inside a tunnel or a road on girders is actually a low-grade slope (or a no-grade flat road), the existing apparatus is likely to erroneously determine that the road is part of a downhill section and, as a result, execute unnecessary support control over a section that is originally not a slope.

For example, when the existing apparatus erroneously recognizes a section on which the vehicle will pass as part of a downhill section although the section is actually a flat road, the existing apparatus decreases the SOC such that the SOC approaches from a first target SOC to a second target SOC lower than the first target SOC by the time the vehicle reaches a point recognized as the start point of the downhill section. However, the vehicle actually travels on a flat road not on a downhill on that downhill section, so the SOC of the storage battery does not increase as expected and, on the contrary, reduces as a result of traveling on the flat road, and the SOC is likely to reach the lower limit of the management range. When the SOC reaches the lower limit of the management range, the existing apparatus starts the internal combustion engine in order to charge the storage battery, which is a cause of deterioration of the fuel consumption.

In contrast, when the existing apparatus erroneously recognizes a section on which the vehicle will pass as a flat road although the section is actually a downhill, the existing apparatus does not execute support control. Therefore, the SOC is not sufficiently decreased before the start point of the down grade, the existing apparatus is likely not to be able to recover regenerative energy that could have been originally recovered.

SUMMARY

This disclosure provides a control apparatus for a hybrid vehicle, which is able to reduce the possibility of executing unnecessary support control or the possibility of not executing necessary support control by enabling a more accurate search for a downhill section in a scheduled travel route of the hybrid vehicle.

A first aspect of the disclosure provides a control apparatus for a hybrid vehicle. The control apparatus includes: first storage means for storing map information; scheduled route determination means for determining a scheduled travel route from a current location of the hybrid vehicle to a destination on the basis of the map information; controlled section determination means for searching for a target downhill section that satisfies a predetermined condition within the scheduled travel route on the basis of measured gradient information pertaining to a gradient and stored in the first storage means for each road section that constitutes the scheduled travel route, and, when there is the target downhill section, determining, within a section from a downhill control start point that is located a predetermined first distance from a start point of the target downhill section to an end point of the target downhill section, a controlled section including at least a section from the downhill control start point to the start point of the target downhill section; control execution means for, when the hybrid vehicle travels on the downhill control section, executing downhill control in which the target remaining amount of charge is changed to a first remaining amount of charge lower than the normal remaining amount of charge; gradient information acquisition means for, when the hybrid vehicle has traveled on a road section, acquiring actual gradient information pertaining to an actual gradient of the road section with use of a sensor provided in the hybrid vehicle; and second storage means for storing the actual gradient information in association with the road section. The controlled section determination means is configured to, when the actual gradient information of the road section that constitutes the scheduled travel route is stored in the second storage means in a case of searching for the target downhill section, search for the target downhill section by using the actual gradient information instead of the measured gradient information for the road section of which the actual gradient information is stored.

With this configuration, in searching for the target downhill section, the measured gradient information stored in the first storage means is used for the road section (a section corresponding to a link) in the scheduled travel route and on which the hybrid vehicle travels for the first time (in other words, the road section on which the hybrid vehicle has not traveled yet), and the actual gradient information acquired and learned at the time when the hybrid vehicle has traveled on a road section in the past and stored in the second storage means is used for the road section. Therefore, as the number of road sections on which the hybrid vehicle has actually traveled in the past increases among road sections that constitute a scheduled travel route, it is possible to more accurately search for a target downhill section. As a result, it is possible to reduce the possibility of executing unnecessary downhill control (support control) as a result of erroneously recognizing a road section as a downhill section although the road section is originally not a target downhill section and the possibility of missing execution of downhill control as a result of recognizing that a road section as not a target downhill section although the road section is originally a target downhill section. As a result, the apparatus is able to further improve the fuel consumption of the hybrid vehicle.

In the above aspect, the control apparatus may further include erasing means for, when the road section in the map information has been changed, erasing the actual gradient information corresponding to the changed road section from the second storage means.

When the road section in the map information has been changed, there is a possibility that, for example, a new road is added for the road section. For this reason, the actual gradient information acquired on the basis of traveling in the past is highly likely to be no longer correct. Therefore, by providing the erasing means as described above, it is possible to reduce the possibility of searching for a target downhill section on the basis of erroneous actual gradient information.

A second aspect of the disclosure provides a control apparatus that is applied to a hybrid vehicle. The hybrid vehicle includes an internal combustion engine that serves as a drive source of the hybrid vehicle, an electric motor that serves as a drive source of the hybrid vehicle, and a storage battery that supplies electric power to the electric motor. The hybrid vehicle is configured to perform regenerative braking with use of the electric motor and to charge the storage battery with electric power generated through the regenerative braking. The hybrid vehicle is also configured to charge the storage battery with electric power generated by using output power of the internal combustion engine. The control apparatus is configured to control the internal combustion engine and the electric motor such that a required driving force that is required from the hybrid vehicle is satisfied and a remaining amount of charge of the storage battery approaches a target remaining amount of charge set to a normal remaining amount of charge. The control apparatus includes: a first storage device to store map information; a first electronic controller configured to determine a scheduled travel route from a current location of the hybrid vehicle to a destination on the basis of the map information, the first electronic controller being configured to search for a target downhill section that satisfies a predetermined condition within the scheduled travel route on the basis of measured gradient information pertaining to a gradient and stored in the first storage device for each road section that constitutes the scheduled travel route, and, when there is the target downhill section, determine, within a section from a downhill control start point that is located a predetermined first distance from a start point of the target downhill section to an end point of the target downhill section, a controlled section including at least a section from the downhill control start point to the start point of the target downhill section, the first electronic controller being configured to, when the hybrid vehicle has traveled on a road section, acquire actual gradient information pertaining to an actual gradient of the road section from a sensor provided in the hybrid vehicle; a second electronic controller configured to, when the hybrid vehicle travels on the downhill control section, execute downhill control in which the target remaining amount of charge is changed to a first remaining amount of charge lower than the normal remaining amount of charge; and a second storage device configured to store the actual gradient information in association with the road section. The first electronic controller is configured to, when the actual gradient information of the road section that constitutes the scheduled travel route is stored in the second storage device in a case of searching for the target downhill section, search for the target downhill section by using the actual gradient information instead of the measured gradient information for the road section of which the actual gradient information is stored.

In the above aspect, the first electronic controller may be further configured to, when the road section in the map information has been changed, erase the actual gradient information corresponding to the changed road section from the second storage device.

A third aspect of the disclosure provides a control apparatus that is applied to a hybrid vehicle. The control apparatus includes: a first memory to store map information; circuitry configured to: determine a scheduled travel route from a current location of the hybrid vehicle to a destination on the basis of the map information, the first electronic controller being configured to search for a target downhill section that satisfies a predetermined condition within the scheduled travel route on the basis of measured gradient information pertaining to a gradient and stored in the first memory for each road section that constitutes the scheduled travel route, and, when there is the target downhill section, determine, within a section from a downhill control start point that is located a predetermined first distance from a start point of the target downhill section to an end point of the target downhill section, a controlled section including at least a section from the downhill control start point to the start point of the target downhill section, and the first electronic controller being configured to, when the hybrid vehicle has traveled on a road section, acquire actual gradient information pertaining to an actual gradient of the road section from a sensor provided in the hybrid vehicle, and when the hybrid vehicle travels on the downhill control section, execute downhill control in which the target remaining amount of charge is changed to a first remaining amount of charge lower than the normal remaining amount of charge; and a second memory to store the actual gradient information in association with the road section. The circuitry is configured to, when the actual gradient information of the road section that constitutes the scheduled travel route is stored in the second memory in a case of searching for the target downhill section, search for the target downhill section by using the actual gradient information instead of the measured gradient information for the road section of which the actual gradient information is stored. In the above aspect, the circuitry may be further configured to, when the road section in the map information has been changed, erase the actual gradient information corresponding to the changed road section from the second memory.

The elements of the disclosure are not limited to the embodiments described below. Other features and associated advantages of the disclosure will be easily understood from the embodiments of the disclosure, which will be described with reference to the accompanying drawings.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a flowchart that shows a downhill control routine that is executed by the CPU of a power management ECU (PM ECU) of the hybrid vehicle shown in FIG. 1;

FIG. 6 is a flowchart that shows a vehicle travel control routine that is executed by the CPU of the PM ECU of the hybrid vehicle shown in FIG. 1;

FIG. 7A and FIG. 7B are lookup tables that are consulted by the PM ECU of the hybrid vehicle shown in FIG. 1, in which FIG. 7A is a lookup table in the case where a target remaining amount of charge is a first remaining amount of charge and FIG. 7B is a lookup table in the case where the target remaining amount of charge is a normal remaining amount of charge;

DETAILED DESCRIPTION OF ILLUSTRATIVE EMBODIMENTS

Hereinafter, a control apparatus (hereinafter, also referred to as the control apparatus) for a hybrid vehicle according to embodiments of the disclosure will be described with reference to the accompanying drawings.

First Embodiment

Configuration

Figure 1:
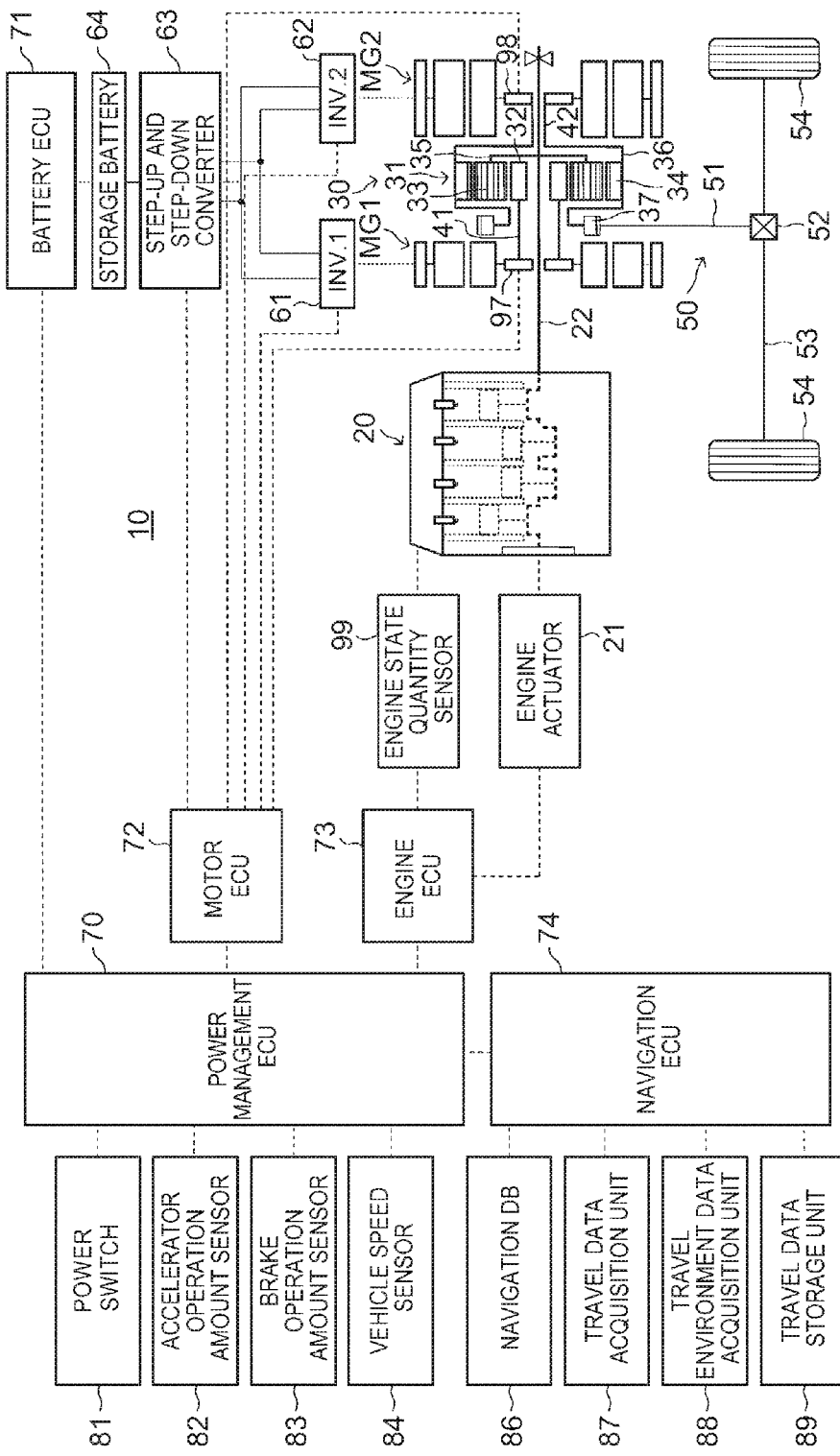
FIG. 1 is a schematic view of a hybrid vehicle, to which a control apparatus for a vehicle according to a first embodiment of the disclosure is applied, and the control apparatus.

A control apparatus (hereinafter, referred to as first apparatus) for a hybrid vehicle according to the first embodiment of the disclosure is applied to a hybrid vehicle 10 (hereinafter, also simply referred to as vehicle) shown in FIG. 1.

The vehicle 10 includes a first generator motor MG1, a second generator motor MG2, an internal combustion engine 20, a power split mechanism 30, a driving force transmission mechanism 50, a first inverter 61, a second inverter 62, a step-up and step-down converter 63, a storage battery 64, a power management ECU 70, a battery ECU 71, a motor ECU 72, an engine ECU 73, a navigation ECU 74, and the like. These ECUs may be integrated as one ECU.

The ECU is an abbreviation of electronic control unit. The ECU is an electronic control circuit including a microcomputer as a main component. The microcomputer includes a CPU, a ROM, a RAM, a backup RAM (or a nonvolatile memory), an interface, and the like.

The first generator motor MG1 is a synchronous generator motor that is able to function as any of a generator and an electric motor. The first generator motor MG1 mainly exercises the function of a generator in the present embodiment. The first generator motor MG1 includes a first shaft 41 that is an output shaft.

The second generator motor MG2, as well as the first generator motor MG1, is a synchronous generator motor that is able to function as any of a generator and an electric motor. The second generator motor MG2 mainly exercises the function of an electric motor in the present embodiment. The second generator motor MG2 includes a second shaft 42 that is an output shaft.

The internal combustion engine (hereinafter, also simply referred to as engine) 20 is a four-cycle spark-ignition multi-cylinder internal combustion engine. The engine 20 includes an engine actuator 21. For example, the engine actuator 21 includes a fuel supply device including fuel injection valves, an ignition device including ignition plugs, an actuator for changing the opening degree of a throttle valve, a variable intake valve control apparatus (VVT), and the like. The engine 20 is configured to be able to change an intake air amount by changing the opening degree of the throttle valve by the use of the throttle valve actuator, and change the torque and engine rotation speed of the engine 20 (that is, engine output power) by, for example, changing a fuel injection amount in response to the intake air amount. The throttle valve is arranged in an intake passage. The engine 20 generates torque on a crankshaft 22. The crankshaft 22 is the output shaft of the engine 20.

The power split mechanism 30 includes a planetary gear unit 31. The planetary gear unit 31 includes a sun gear 32, a plurality of planetary gears 33, and a ring gear 34.

The sun gear 32 is connected to the first shaft 41 of the first generator motor MG1. Therefore, the first generator motor MG1 is able to output torque to the sun gear 32. The first generator motor MG1 is able to generate electric power by being driven to rotate by torque that is input from the sun gear 32 to the first generator motor MG1.

Each of the plurality of planetary gears 33 is in mesh with the sun gear 32 and is also in mesh with the ring gear 34. The rotary shaft (rotation axis) of each planetary gear 33 is provided in a planetary carrier 35. The planetary carrier 35 is supported coaxially with the sun gear 32 so as to be rotatable. The planetary carrier 35 is connected to the crankshaft 22 of the engine 20.

The ring gear 34 is supported coaxially with the sun gear 32 so as to be rotatable.

When torque is input from the planetary gears 33 to the sun gear 32, the sun gear 32 is driven to rotate by the torque. When torque is input from the planetary gears 33 to the ring gear 34, the ring gear 34 is driven to rotate by the torque. On the contrary, when torque is input from the sun gear 32 to the planetary gears 33, the planetary gears 33 are driven to rotate by the torque. When torque is input from the ring gear 34 to the planetary gears 33, the planetary gears 33 are driven to rotate by the torque.

The ring gear 34 is connected to the second shaft 42 of the second generator motor MG2 via a ring gear carrier 36. Therefore, the second generator motor MG2 is able to output torque to the ring gear 34. The second generator motor MG2 is able to generate electric power by being driven to rotate by torque that is input from the ring gear 34 to the second generator motor MG2.

The ring gear 34 is connected to an output gear 37 via the ring gear carrier 36. Therefore, the output gear 37 can be driven to rotate by torque that is input from the ring gear 34 to the output gear 37. The ring gear 34 can be driven to rotate by torque that is input from the output gear 37 to the ring gear 34.

The driving force transmission mechanism 50 includes an axle 51, a differential gear 52 and a drive shaft 53.

The axle 51 connects the output gear 37 with the differential gear 52 such that power is transmittable. The differential gear 52 is connected to the drive shaft 53. Drive wheels 54 are respectively connected to both ends of the drive shaft 53. Therefore, torque from the output gear 37 is transmitted to the drive wheels 54 via the axle 51, the differential gear 52 and the drive shaft 53. The hybrid vehicle 10 is able to travel by using the torque transmitted to the drive wheels 54.

The first inverter 61 is electrically connected to the first generator motor MG1 and is also electrically connected to the storage battery 64 via the step-up and step-down converter 63. Therefore, when the first generator motor MG1 is generating electric power, electric power generated by the first generator motor MG1 is supplied to the storage battery 64 via the first inverter 61 and the step-up and step-down converter 63. On the contrary, the first generator motor MG1 is driven to rotate by electric power that is supplied from the storage battery 64 via the step-up and step-down converter 63 and the first inverter 61.

The second inverter 62 is electrically connected to the second generator motor MG2 and is also electrically connected to the storage battery 64 via the step-up and step-down converter 63. Therefore, the second generator motor MG2 is driven to rotate by electric power that is supplied from the storage battery 64 via the step-up and step-down converter 63 and the second inverter 62. On the contrary, when the second generator motor MG2 is generating electric power, electric power generated by the second generator motor MG2 is supplied to the storage battery 64 via the second inverter 62 and the step-up and step-down converter 63.

Electric power that is generated by the first generator motor MG1 is allowed to be directly supplied to the second generator motor MG2, and electric power that is generated by the second generator motor MG2 is allowed to be directly supplied to the first generator motor MG1.

The storage battery 64 is an electrical storage means that stores electric energy for driving the first generator motor MG1 or the second generator motor MG2. The storage battery 64 is a secondary battery, such as a lithium ion battery, that is able to repeat charging and discharging. An SOC sensor is connected to the storage battery 64. The SOC sensor is used to detect the SOC. The battery ECU 71 is able to monitor the SOC of the storage battery 64.

The storage battery 64 should be a chargeable and dischargeable electrical storage device. The storage battery 64 may be not only a lithium ion battery but also a nickel-metal hydride battery, a lead storage battery, a nickel-cadmium battery or another secondary battery.

The power management ECU 70 (hereinafter, also referred to as PM ECU 70) is connected to the battery ECU 71, the motor ECU 72, the engine ECU 73 and the navigation ECU 74 (described later) via controller area network (CAN) communication such that information is exchangeable with each other.

The PM ECU 70 receives output signals from a power switch 81, an accelerator operation amount sensor 82, a brake operation amount sensor 83, a vehicle speed sensor 84, and the like. The power switch 81 is a switch for starting up the system of the hybrid vehicle 10.

The accelerator operation amount sensor 82 generates an output signal indicating the operation amount (hereinafter, referred to as accelerator operation amount AP) of an accelerator pedal. The accelerator pedal is provided so as to be operable by a driver. The accelerator operation amount AP may also be expressed as accelerating operation amount. The brake operation amount sensor 83 generates an output signal indicating the operation amount BP of a brake pedal that is operated by the driver. The vehicle speed sensor 84 generates an output signal indicating the vehicle speed SPD (=Vx) of the hybrid vehicle 10.

The PM ECU 70 receives the remaining amount of charge SOC of the storage battery 64 that is acquired by the battery ECU 71. The remaining amount of charge SOC is calculated by a technique on the basis of, for example, an integrated value of current flowing from and into the storage battery 64.

The PM ECU 70 receives a signal indicating the rotation speed of the first generator motor MG1 and a signal indicating the rotation speed of the second generator motor MG2 via the motor ECU 72. The signal indicating the rotation speed of the first generator motor MG1 is referred to as MG1 rotation speed Nm1. The signal indicating the rotation speed of the second generator motor MG2 is referred to as MG2 rotation speed Nm2.

The MG1 rotation speed Nm1 is calculated on the basis of an output value of a resolver 97 by the motor ECU 72. The resolver 97 is provided in the first generator motor MG1, and outputs an output value corresponding to the rotation angle of the rotor of the first generator motor MG1. Similarly, the MG2 rotation speed Nm2 is calculated on the basis of an output value of a resolver 98 by the motor ECU 72. The resolver 98 is provided in the second generator motor MG2, and outputs an output value corresponding to the rotation angle of the rotor of the second generator motor MG2.

The PM ECU 70 receives an output signal indicating an engine state via the engine ECU 73. The engine state is detected by an engine state quantity sensor 99. The output signal indicating the engine state includes an engine rotation speed NE, a throttle valve opening degree TA, an engine coolant temperature THW, an atmospheric pressure Pa, and the like.

The motor ECU 72 is connected to the first inverter 61, the second inverter 62 and the step-up and step-down converter 63. The motor ECU 72 transmits command signals to the first inverter 61, the second inverter 62 and the step-up and step-down converter 63 on the basis of commands (for example, MG1 command torque Tm1* and MG2 command torque Tm2*) from the PM ECU 70. Thus, the motor ECU 72 controls the first generator motor MG1 by using the first inverter 61 and the step-up and step-down converter 63, and controls the second generator motor MG2 by using the second inverter 62 and the step-up and step-down converter 63.

The engine ECU 73 controls the engine 20 by transmitting a command signal to the engine actuator 21 on the basis of a command from the PM ECU 70 and a signal from the engine state quantity sensor 99.

The navigation ECU (hereinafter, also referred to as NV ECU) 74 is electrically connected to a navigation database 86, a travel data acquisition unit 87, a travel environment data acquisition unit 88, a travel data storage unit 89, and the like.

The navigation database (hereinafter, also referred to as NV DB) 86 stores various data, such as map data, route calculation data, image data, voice data and index data. These data are used to, for example, provide navigation service to the driver (or a passenger), determine (hereinafter, also referred to as plan) the operation schedule of the engine 20 and/or the second generator motor MG2 and determine a target remaining amount of charge of the storage battery 64.

The various data in the NV DB 86 are stored in a storage device, such as a magnetic disk (HDD) and a semiconductor memory.

The map data include road data, guidance data, and the like. The road data include road identification information for determining roads on the map data. The guidance data include intersection names, and the like, that are used for route guidance.

The route calculation data include link information, node information, regulation information, and the like. The link information is information pertaining to road sections of a road network. The node information is information pertaining to intersections of the road network. The regulation information is information pertaining to road regulation. The node information and the link information are utilized in downhill search (searching for a target downhill section), downhill control (described later), and the like. Each link is associated with the gradient (average gradient value) of a road section corresponding to the link, the altitudes (altitude data) of points of both ends of the road section corresponding to the link, the distance of the road section corresponding to the link, and the like. An individual ID (link ID) is assigned to each link. Therefore, for example, when a new road is constructed between a node and another node, the ID of a link (link ID) between those nodes and information associated with the link are changed. Information including route calculation data and map data is also referred to as map information.

The travel data acquisition unit 87 acquires travel data, such as the current position, travel speed, and the like, of the vehicle 10 at predetermined intervals during a period from when the power switch 81 of the vehicle is turned on to when the power switch 81 is turned off. The predetermined intervals mean predetermined time intervals (for example, intervals of 100 msec), predetermined distance intervals (for example, intervals of 100 m), or the like.

The travel data acquisition unit 87 includes a global positioning system (GPS) receiving device. The travel data acquisition unit 87 receives GPS information with the use of the GPS receiving device. The GPS information is transmitted from GPS satellites. The travel data acquisition unit 87 acquires the positional information (latitude and longitude) of the vehicle by analyzing the received GPS information. In this way, the travel data acquisition unit 87 may also be regarded as a positional information acquisition unit that acquires the positional information of the vehicle 10.

The travel environment data acquisition unit 88 acquires date, time, a day of the week, date and time of departure of the vehicle, and route information, and then provides those pieces of data to the NV ECU 74 as the travel environment data. The route information is information pertaining to a travel environment around the vehicle at the time when the vehicle is traveling, and includes, for example, weather information, traffic congestion information, traffic regulation information, road construction information and event information.

More specifically, the travel environment data acquisition unit 88 acquires data and time information, such as current time, date and a day of the week. The travel environment data acquisition unit 88 includes, for example, a device that receives and acquires information from VICS (registered trademark). The information from VICS includes traffic congestion information, traffic accident, disabled vehicle and construction information, speed regulation and lane regulation information, and the like. In this way, the travel environment data acquisition unit 88 may also be regarded as a route information acquisition unit that acquires various pieces of information pertaining to the conditions of a route along which the vehicle 10 travels.

The travel data storage unit 89 stores the travel data acquired by the travel data acquisition unit 87 and the travel environment data acquired by the travel environment data acquisition unit 88. The travel data storage unit 89 stores a learned gradient value (described later).

Information processing that is executed by the NV ECU 74 includes, for example, route guidance for the driver and generating and providing navigation information that is used by the PM ECU 70 to execute downhill control. In the process of route guidance, the NV ECU 74 searches for a route from a current location to a destination set by the driver, or the like, with the use of user interface, shows the route to the driver, and guides the driver to the destination while acquiring a current position.

Outline of Operation

Next, downhill control (support control) that is executed by the PM ECU 70, the NV ECU 74, and the like, of the control apparatus will be described with reference to FIG. 2.

Outline of Downhill Control

Figure 2:
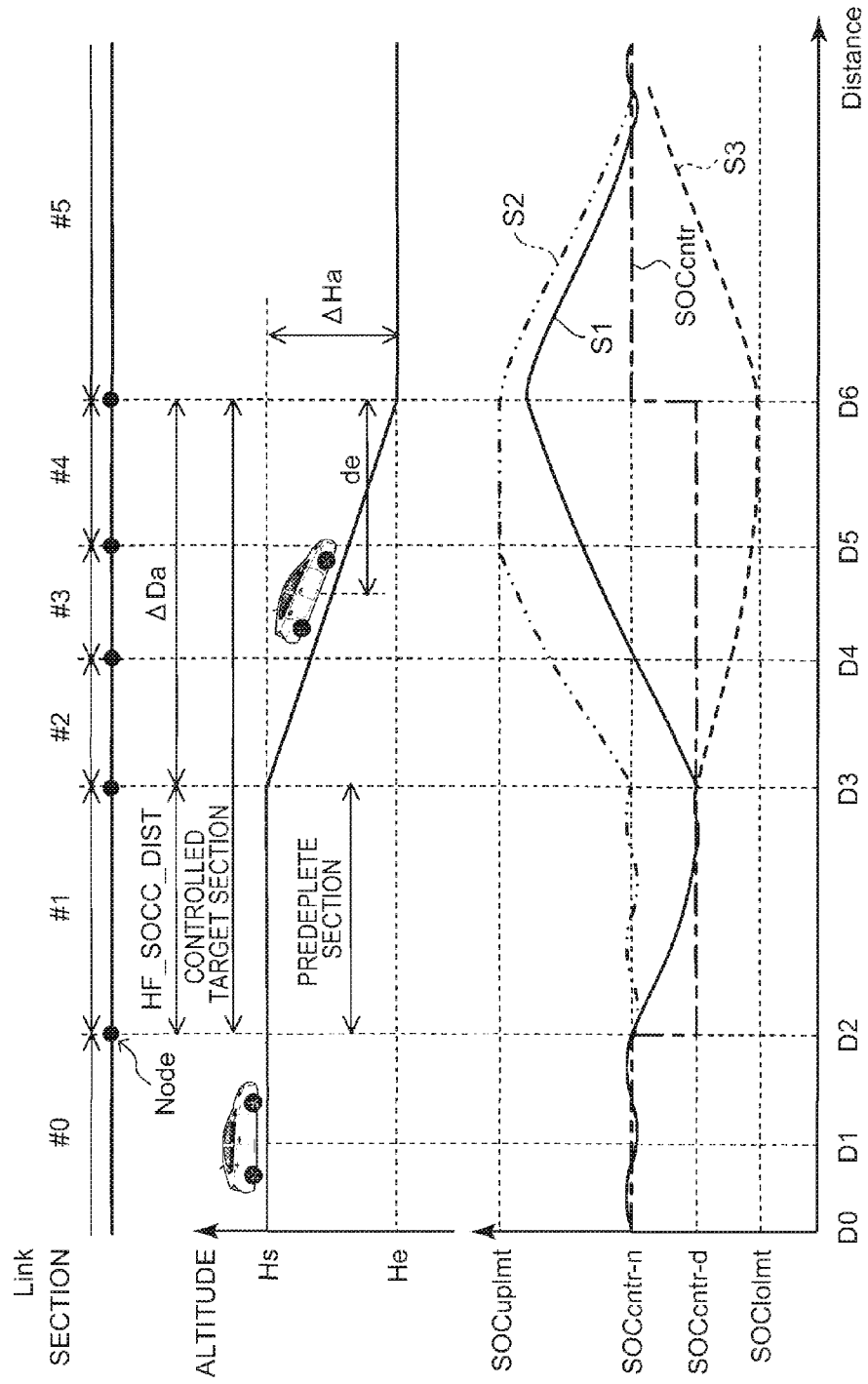
FIG. 2 is a chart that shows changes in the remaining amount of charge of a storage battery under downhill control that is executed by the control apparatus for a hybrid vehicle, shown in FIG. 1, and the remaining amount of charge of a storage battery under downhill control that is executed by an existing apparatus.

The abscissa axis of FIG. 2 represents a point in a scheduled travel route of the vehicle 10 by distance. In the example shown in FIG. 2, the scheduled travel route includes six road sections corresponding to link #0 to link #5. The connection point between adjacent links is a node. The ordinate axis of FIG. 2 represents the altitude of a road in the scheduled travel route of the vehicle 10 and the SOC of the storage battery 64.

The scheduled travel route shown in FIG. 2 includes a downhill that runs from a flat road having an altitude Hs to a flat road having an altitude He (Altitude Hs>Altitude He). The downhill consists of three sections corresponding to link #2 to link #4.

In order to prevent or reduce the progress of degradation of the storage battery 64, the first apparatus sets an upper limit remaining amount of charge SOCuplmt and a lower limit remaining amount of charge SOClolmt, and controls (manages) the remaining amount of charge SOC such that the remaining amount of charge SOC falls within the range (SOC management range) from the upper limit remaining amount of charge SOCuplmt to the lower limit remaining amount of charge SOClolmt.

During ordinary traveling other than during downhill traveling, traffic congestion traveling, and the like, the first apparatus sets the target remaining amount of charge SOCcntr to an ordinary traveling target remaining amount of charge (hereinafter, also referred to as normal remaining amount of charge) SOCcntr-n. For example, the upper limit remaining amount of charge SOCuplmt is set to a value corresponding to 80% of full charge, the lower limit remaining amount of charge SOClolmt is set to a value corresponding to 40% of full charge, and the normal remaining amount of charge SOCcntr-n is set to a value corresponding to 60% of full charge.

During ordinary traveling, the PM ECU 70 controls the engine 20, the second generator motor MG2 and the first generator motor MG1 such that driving force or braking force or both that are required from the vehicle 10 are satisfied and an actual SOC approaches the normal remaining amount of charge SOCcntr-n. That is, the normal remaining amount of charge SOCcntr-n is the target remaining amount of charge during ordinary traveling. In the example shown in FIG. 2, the SOC of the storage battery 64 at point D0 is controlled to a value near the normal remaining amount of charge SOCcntr-n.

The vehicle 10 during ordinary traveling performs a downhill search at point D1. The downhill search will be described later. In this example, description will be continued on the assumption that three sections corresponding to link #2 to link #4 correspond to a downhill section on which downhill control is executed (hereinafter, may be referred to as target downhill section).

The NV ECU 74 performs a downhill search each time a predetermined time (in this example, five minutes that is a time interval at which VICS information is updated) elapses. Now, it is assumed that the vehicle 10 has reached the point D1 at timing at which a downhill search is performed. At this point in time, the vehicle 10 is performing ordinary traveling and is not executing downhill control. The NV ECU 74 may perform a downhill search each time the vehicle travels a predetermined distance.

The NV ECU 74 determines a target downhill section in this downhill search. The target downhill section is a target of downhill control in the scheduled travel route. Specifically, the NV ECU 74 determines a section corresponding to a first link group as a target downhill section on the basis of the information in the NV DB 86. The first link group includes a single or plurality of successive links among a group of links corresponding to the scheduled travel route, and satisfies all the following conditions. However, the following conditions are only illustrative, and the conditions are not limited to these.

(1) The distance from the current position of the vehicle 10 falls within a set distance (for example, a radius of 10 km).

(2) Any road section corresponding to each link of the first link group has a down grade lower than a predetermined threshold gradient. In this example, the gradient is defined such that a downhill is indicated by a negative value and an uphill is indicated by a positive value in the case where the vehicle travels on a road section corresponding to a link in the forward direction. Therefore, when a road section in the vehicle traveling direction is a heavy slope having a large down grade, the gradient becomes a negative value having a large absolute value.

(3) The altitude Hs of the start point of the first link group is higher than the altitude He of the end point of the first link group (Hs>He), and the absolute value of the difference (altitude difference $\Delta Ha = |Hs-He|$) is larger than or equal to a predetermined altitude difference (SOC_STL_H).

(4) A total distance $\Delta Da$ of each road section corresponding to the first link group is longer than or equal to a predetermined distance (SOC_STL_D).

In the example shown in FIG. 2, the first link group consisting of link #2 to link #4 satisfies the conditions (1) to (4), so the road sections corresponding to link #2 to link #4 (that is, a section from point D3 to point D6) are determined as a target downhill section. The NV ECU 74 stores a start point Dk (that is, the latitude and longitude of the point D3) of the determined target downhill section and an end point De (that is, the latitude and longitude of the point D6) of the determined target downhill section.

The NV ECU 74 determines point Ds that is located a predetermined first distance (remaining amount of charge adjustment distance (HF_SOCC_DIST)) from the start point (that is, the point D3) of the target downhill section, and provides the latitude and longitude of that point to the PM ECU 70 as the latitude and longitude of the start point Ds of downhill control. The NV ECU 74 may redetermine the point of a node closest to the point Ds and closer to the vehicle 10 than the point Ds as point Ds. In other words, the first distance may be some range of distances. A section from the downhill control start point Ds to the start point Dk (point D3) of the target downhill section may be referred to as predeplete section. In the example shown in FIG. 2, the remaining amount of charge adjustment distance (HF_SOC-C_DIST) coincides with the distance of a section corresponding to link #1. A section that is a combination of the predeplete section and the target downhill section is a section on which downhill control is executed, so the section is also referred to as controlled target section or downhill control section.

The NV ECU 74 transmits the downhill control start point Ds, the start point Dk (that is, the point D3) of the target downhill section and the downhill control end point De (the end point De of the target downhill section, that is, the point D6) to the PM ECU 70 when these points are updated.

The PM ECU 70 (and the battery ECU 71) has been acquiring the current location (current position) of the vehicle 10 from the NV ECU 74 whenever necessary. When the current location coincides with the downhill control start point Ds (that is, when the vehicle 10 reaches point D2 in FIG. 2), the PM ECU 70 (and the battery ECU 71) executes target remaining amount of charge decreasing control that is part of downhill control. More specifically, when the current location coincides with the downhill control start point Ds, the PM ECU 70 (and the battery ECU 71) changes the target remaining amount of charge SOCcntr from the normal remaining amount of charge SOCcntr-n to a downhill control target remaining amount of charge (for the sake of convenience, also referred to as low remaining amount of charge or first remaining amount of charge) SOCcntr-d. Changes in the target remaining amount of charge SOCcntr are indicated by the alternate long and short dashes line in FIG. 2. The downhill control target remaining amount of charge SOCcntr-d is a value smaller than the ordinary target remaining amount of charge SOCcntr-n (60% of full charge), and is set to, for example, 50% of full charge.

Incidentally, the hybrid vehicle 10 travels in hybrid mode (HV mode).

In short, the hybrid mode is a drive mode that permits usage of the internal combustion engine 20 in addition to the second generator motor MG2 in causing the vehicle 10 to travel. Specifically, the hybrid mode is a mode in which the second generator motor MG2 is driven, the internal combustion engine 20 is operated at an operating point at which the operation efficiency is maximum and the vehicle 10 is caused to travel while a required torque (required driving force, that is, user required torque) that is required from the vehicle 10 is satisfied by the output power of both second generator motor MG2 and the internal combustion engine 20.

In this drive mode, when the output power that is required from the internal combustion engine 20 is smaller than a threshold (that is, when the internal combustion engine 20 cannot be operated at an optimal operating point), the operation of the internal combustion engine 20 is stopped. On the other hand, when the output power that is required from the internal combustion engine 20 is larger than or equal to the threshold, the internal combustion engine 20 is operated at the optimal operating point such that the required output power is satisfied. As a result, a shortage of torque (driving force) with respect to the required torque is compensated by the use of the second generator motor MG2, while, at the same time, the storage battery 64 is charged by using the output power of the internal combustion engine 20. As the remaining amount of charge SOC decreases with respect to the target remaining amount of charge SOCcntr, the output power that is required from the internal combustion engine 20 to charge the storage battery 64 increases. For this reason, as the remaining amount of charge SOC decreases, the internal combustion engine 20 is more easily operated.

When the remaining amount of charge SOC becomes lower than or equal to the lower limit remaining amount of charge SOClolmt, the internal combustion engine 20 is forcibly operated even if the internal combustion engine 20 cannot be operated at the optimal operating point, and the storage battery 64 is charged with electric power generated by the second generator motor MG2 and the first generator motor MG1 by using the output power of the internal combustion engine 20. That is, forcible charging is performed.

In the predeplete section, the PM ECU 70 decreases the remaining amount of charge SOC by operating the second generator motor MG2 to consume electric power such that the remaining amount of charge SOC approaches the target remaining amount of charge SOCcntr-d (see the continuous line S1 in FIG. 2).

In the example shown in FIG. 2, the remaining amount of charge SOC decreases to the first remaining amount of charge SOCcntr-d by the time the vehicle 10 travels on the predeplete section and reaches the start point D3 of the target downhill section. That is, the above-described remaining amount of charge adjustment distance HF_SOCC_DIST is set as a sufficient distance in order to bring the SOC of the storage battery 64 from the normal remaining amount of charge SOCcntr-n close to the downhill control first remaining amount of charge SOCcntr-d by operating the second generator motor MG2 to consume electric power stored in the storage battery 64. The remaining amount of charge adjustment distance HF_SOCC_DIST is set to, for example, about 5 km; however, it may be shorter or longer than 5 km depending on the travel route or travel condition of the vehicle 10.

As the vehicle 10 starts traveling on the target downhill section, regenerative braking using the first generator motor MG1 or the second generator motor MG2 or both is frequently performed. As a result, electric power generated through regenerative braking (regenerative energy) is supplied to the storage battery 64, so the remaining amount of charge SOC gradually increases. In other words, the NV ECU 74 determines the following downhill as the target downhill section. The downhill is such that regenerative energy exceeds energy that is used for propelling the vehicle 10 and, as a result, the remaining amount of charge SOC increases.

When the current location of the vehicle 10 coincides with the downhill control end point De (that is, when the vehicle 10 reaches the point D6 in FIG. 2), the PM ECU 70 (and the battery ECU 71) ends downhill control (in this example, target remaining amount of charge decreasing control). More specifically, the PM ECU 70 (and the battery ECU 71) changes (returns) the target remaining amount of charge SOCcntr from the first remaining amount of charge SOCcntr-d to the normal remaining amount of charge SOCcntr-n. After that, the vehicle 10 travels on a flat road (section corresponding to link #5). Therefore, the remaining amount of charge SOC gradually approaches the ordinary target remaining amount of charge SOCcntr-n. The NV ECU 74 may provide notification to the PM ECU 70 that the current location of the vehicle has reached the point Ds, Dk or De, and the PM ECU 70 may start or end downhill control in accordance with the notification.

Incidentally, the case where the NV ECU 74 (or the PM ECU 70) has erroneously determined that there is no target downhill section because a gradient contained in the map information (or a gradient that is calculated on the basis of altitudes contained in the map information) differs from an actual gradient although there is actually a target downhill section in the scheduled travel route will be described. In this case, the actual remaining amount of charge SOC changes as indicated by the alternate long and two-short dashes line S2 in FIG. 2, and the remaining amount of charge SOC reaches the upper limit remaining amount of charge SOCuplmt while the vehicle 10 is traveling on the downhill. For this reason, the PM ECU 70 stops supplying electric power that is generated through regenerative braking (regenerative energy) to the storage battery 64 such that the remaining amount of charge SOC does not exceed the upper limit remaining amount of charge SOCuplmt. Therefore, in this case, regenerative energy that is not recovered by the storage battery 64 is converted to thermal energy, or the like, and is consumed.

In contrast, the case where the NV ECU 74 (or the PM ECU 70) has erroneously determined that there is a target downhill section because a gradient contained in the map information (or a gradient that is calculated on the basis of altitudes contained in the map information) differs from an actual gradient although there is actually no target downhill section in the scheduled travel route will be described. In this case, the actual remaining amount of charge SOC changes as indicated by the continuous line S1 up to the point D3 in FIG. 2, and changes as indicated by, for example, the dashed line S3, from the point D3. In FIG. 2, the SOC reaches the lower limit SOC SOClolmt between the point D5 and the point D6, and the PM ECU 70 performs forcible charging of the storage battery 64 by operating the engine 20 such that the SOC does not fall below the lower limit SOC SOClolmt. Thus, the fuel consumption of the vehicle 10 deteriorates.

In this way, one of the causes of not being able to accurately search for a target downhill section is that gradient information (a gradient itself or data, such as altitudes, required to obtain a gradient) contained in the map information stored in the NV DB 86 is created on the basis of the terrain data. For example, when a road section is inside a tunnel, the road section may be indicated to have a gradient because the terrain data are created on the basis of the altitudes of points of a mountain in which the tunnel is provided even when the road section is actually flat.

The first apparatus solves such an inconvenience that it is not possible to accurately search for a target downhill section because of the above reason as follows. That is, when the vehicle 10 is traveling on a road section (section corresponding to a link), the first apparatus calculates the average gradient of the road section with the use of the sensors provided in the vehicle 10, and updates or learns (stores) the gradient (learned gradient value) of the road section on the basis of the calculated average gradient data at the time when the vehicle 10 has completely passed through the road section. At the same time, the first apparatus calculates an altitude difference between the start point and end point of the road section on the basis of the learned gradient value and the distance of the road section corresponding to the learned gradient value, and learns (stores) the altitude difference. These learned values are collectively referred to as actual gradient information. When the first apparatus searches for a target downhill section, the first apparatus uses actual gradient information for a road section of which the actual gradient information has been obtained, and uses gradient information (that is, measured gradient information) contained in the map information stored in the NV DB 86 for another road section. Thus, there is a high possibility that a search for a target downhill section is performed by using information (gradient value, altitudes, or the like) based on a gradient close to an actual gradient, so there is a high possibility that it is possible to avoid the above-described erroneous recognition. Therefore, downhill control is highly likely to be executed in more appropriate situation, so the possibility of making it possible to enhance the fuel consumption performance of the vehicle increases.

Actual Operation

Next, the actual operation of the first apparatus will be described.

Determination of Support Plan

Figure 3:
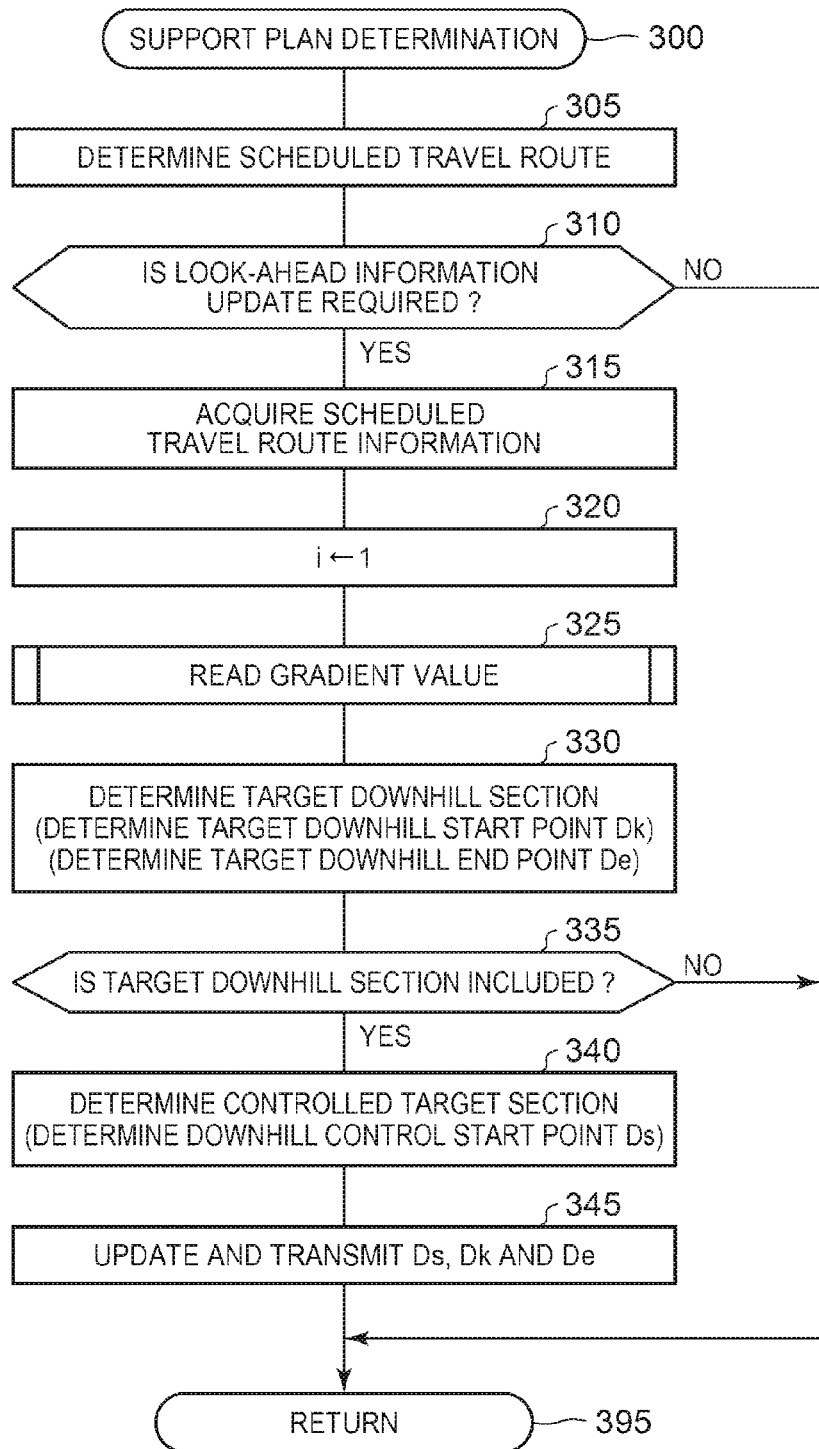
FIG. 3 is a flowchart that shows a support plan determination routine that is executed by a CPU of a navigation ECU (NV ECU) of the hybrid vehicle shown in FIG. 1.

The NV ECU 74 (actually, the CPU) executes a support plan determination routine shown by the flowchart in FIG. 3 each time a lapse of a set time (for example, five minutes that is an interval at which VICS information is updated). Therefore, the NV ECU 74 starts the process from step 300 at predetermined timing, proceeds to step 305, acquires the current position (current location) of the vehicle 10, a destination, latest road information, and the like, and determines the scheduled travel route of the vehicle 10 on the basis of those pieces of information and the map information stored in the NV DB 86.

Subsequently, the NV ECU 74 proceeds to step 310, and determines whether a look-ahead information update is required. A look-ahead information update is required, for example, when the destination of the vehicle 10 is set or changed as a result of driver's operation, when the travel route of the vehicle 10 (when the vehicle 10 leaves from the set travel route), or when traffic information, such as VICS, has been updated.

When it is determined due to the above-described reasons that an update of look-ahead information is required, the NV ECU 74 makes an affirmative determination in step 310, proceeds to step 315, and acquires information pertaining to road sections that constitute the scheduled travel route and that are located within the range of about 10 km from the current position of the vehicle 10. The acquired information pertaining to the scheduled travel route includes the measured gradient information (that is, information pertaining to gradients, which is contained in the map information stored in the NV DB 86 and which includes gradient values (navigation map gradient values)) of each road section (link) in the scheduled travel route. At this time, the NV ECU 74 extracts in advance the total number NL of road sections that constitute the scheduled travel route of which the measured gradient information has been acquired.

Subsequently, the NV ECU 74 proceeds to step 320, and sets the value of a road section number counter i to "1". At the same time, the NV ECU 74 assigns the sequence to the road sections that constitute the scheduled travel route for the sake of convenience. That is, the NV ECU 74 prescribes the road section in which the current location of the vehicle 10 is included as the first road section, prescribes the road section subsequent to the first road section as the second road section, prescribes the road section subsequent to the second road section as the third road section, . . . etc.

Figure 4:
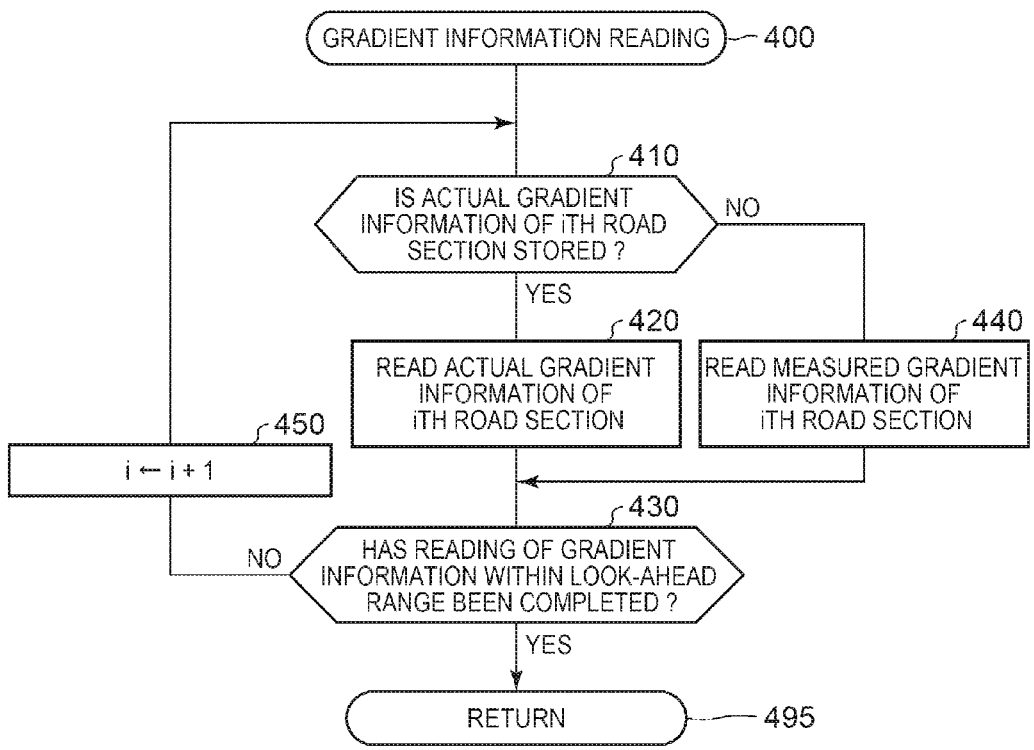
FIG. 4 is a flowchart that shows a gradient value reading routine that is executed by the CPU of the NV ECU of the hybrid vehicle shown in FIG. 1.

Subsequently, the NV ECU 74 proceeds to step 325, and executes a gradient value reading routine (gradient information reading routine) shown in FIG. 4. Therefore, the NV ECU 74 starts the process from step 400 in FIG. 4, proceeds to step 410, and determines whether actual gradient information (including a learned gradient value) acquired at the time when the vehicle 10 traveled in the past is stored in the travel data storage unit 89 for the ith road section (in this case, the value of i is "1"). In other words, the NV ECU 74 determines whether actual gradient information has been learned for the ith road section. A method of calculating and learning actual gradient information including a learned gradient value will be described later.

When the actual gradient information of the ith road section is stored in the travel data storage unit 89, the NV ECU 74 makes an affirmative determination in step 410, proceeds to step 420, acquires the actual gradient information of the ith road section, and stores the information in the RAM as the gradient information of the ith road section. On the other hand, when the actual gradient information of the ith road section is not stored in the travel data storage unit 89, the NV ECU 74 makes a negative determination in step 410, proceeds to step 440, acquires the measured gradient information of the ith road section, which is stored in the NV DB 86, and stores the information in the RAM as the gradient information of the ith road section. Subsequently, the NV ECU 74 proceeds to step 430, and determines whether the value of the road section i becomes larger than or equal to the road section total number NL (that is, when acquisition of gradient information for the road sections within the look-ahead range has been completed).

At the current point in time, the value of i is "1", and has not reached the road section total number NL. That is, acquisition of gradient information for all the road sections acquired in step 315 has not been completed. Thus, the NV ECU 74 makes a negative determination in step 430, proceeds to step 450, increases the value of the road section number counter i by "1", and returns to step 410.

The NV ECU 74 repeats the above-described process, and reads any one of actual gradient information including a learned gradient value and measured gradient information including a navigation map gradient value as the gradient information of the ith road section. When the value of i coincides with the road section total number NL (that is, when acquisition of gradient information for all the road sections acquired in step 315 has been completed), the NV ECU 74 makes an affirmative determination in step 430, and proceeds to step 330 in FIG. 3 via step 495.

In step 330, the NV ECU 74 searches for a first link group that satisfies the above-described conditions (1) to (4) from among the group of links (group of road sections) that constitute the scheduled travel route and of which information has been acquired in step 315, and, when there is such a first link group, determines the first link group. That is, the NV ECU 74 determines a target downhill section. More specifically, when there is a target downhill section, the NV ECU 74 determines the start point Dk and end point De of the target downhill section.

Subsequently, the NV ECU 74 proceeds to step 335, and determines whether the target downhill section is included in the scheduled travel route. When no target downhill section is included in the scheduled travel route, the NV ECU 74 makes a negative determination in step 335, directly proceeds to step 395, and once ends the routine. Therefore, in this case, downhill control is not executed.

In contrast, when the target downhill section is included in the scheduled travel route, the NV ECU 74 makes an affirmative determination in step 335, proceeds to step 340, and determines a controlled target section (a section on which downhill control should be executed). More specifically, the NV ECU 74 determines a point that is located the first distance (remaining amount of charge adjustment distance (HF_SOCC_DIST)) from the start point Dk of the target downhill section as the downhill control start point Ds. The end point of the controlled target section is the end point De of the target downhill section.

Subsequently, the NV ECU 74 proceeds to step 345, stores the points Ds, Dk and De in its own RAM, and also transmits the points Ds, Dk and De to the PM ECU 70. After that, the NV ECU 74 proceeds to step 395, and once ends the routine. When information about the points Ds, Dk and De is transmitted from the NV ECU 74 to the PM ECU 70, the PM ECU 70 stores those pieces of information in the RAM of the PM ECU 70.

In this way, when the NV ECU 74 transmits the points Ds, Dk and De of the controlled target section to the PM ECU 70 in step 345, the NV ECU 74 proceeds to step 395, and once ends the support plan determination routine. When an update of look-ahead information is not required in step 310, the NV ECU 74 makes a negative determination, directly proceeds to step 395, and once ends the routine.

Downhill Control

The PM ECU 70 (actually, the CPU) executes a downhill control routine shown by the flowchart in FIG. 5 for executing downhill control each time a predetermined time elapses. Therefore, at adequate timing, the PM ECU 70 starts the process from step 500 in FIG. 5, proceeds to step 505, and determines whether at least one of the start point Ds and end point De of the downhill control section is stored in the RAM of the PM ECU 70.

When at least one of the start point Ds and the end point De is set, the PM ECU 70 makes an affirmative determination in step 505, proceeds to step 510, and receives the current position Dn acquired by the GPS receiving device (travel data acquisition unit 87) from the NV ECU 74 via communication. Subsequently, the PM ECU 70 proceeds to step 515, and determines whether the current position Dn coincides with the start point Ds.

When the current position Dn coincides with the start point Ds (actually, within the range of plus and minus several tens of meters with respect to the start point Ds), the PM ECU 70 makes an affirmative determination in step 515, proceeds to step 520, and starts downhill control. At this time, the PM ECU 70 changes the target remaining amount of charge SOCcntr to the first remaining amount of charge SOCcntr-d lower than the normal remaining amount of charge SOCcntr-n. In addition, the PM ECU 70 erases the data of the start point Ds from the RAM. Subsequently, the PM ECU 70 proceeds to step 595, and once ends the routine.

On the other hand, when the current position Dn does not coincide with the start point Ds (including the case where the start point Ds has been erased), the PM ECU 70 makes a negative determination in step 515, proceeds to step 525, and determines whether the current position Dn coincides with the end point De.

When the current position Dn does not coincide with the end point De, the PM ECU 70 makes a negative determination in step 525, directly proceeds to step 595, and once ends the routine. In contrast, when the current position Dn coincides with the end point De, the PM ECU 70 makes an affirmative determination in step 525, proceeds to step 530, and ends downhill control. That is, the PM ECU 70 changes the target remaining amount of charge SOCcntr to the normal remaining amount of charge SOCcntr-n. In addition, the PM ECU 70 erases the data of the end point De (and the start point Dk of the target downhill section) from the RAM. Subsequently, the PM ECU 70 directly proceeds to step 595, and once ends the routine.

When neither the start point Ds nor the end point De is set, the PM ECU 70 makes a negative determination in step 505, directly proceeds to step 595, and once ends the routine.

Vehicle Traveling Control

The PM ECU 70 (actually, the CPU) executes a vehicle traveling control routine shown by the flowchart in FIG. 6 each time a sufficiently short predetermined time (for example, 8 ms) elapses. Therefore, the PM ECU 70 starts the process from step 600 at predetermined timing, proceeds to step 605, acquires a user required torque Tu on the basis of the accelerator operation amount AP and the vehicle speed SPD, and acquires a required vehicle output power Pv* (user required output power Pu*) by multiplying the user required torque Tu by the vehicle speed SPD.

Figure 7A:
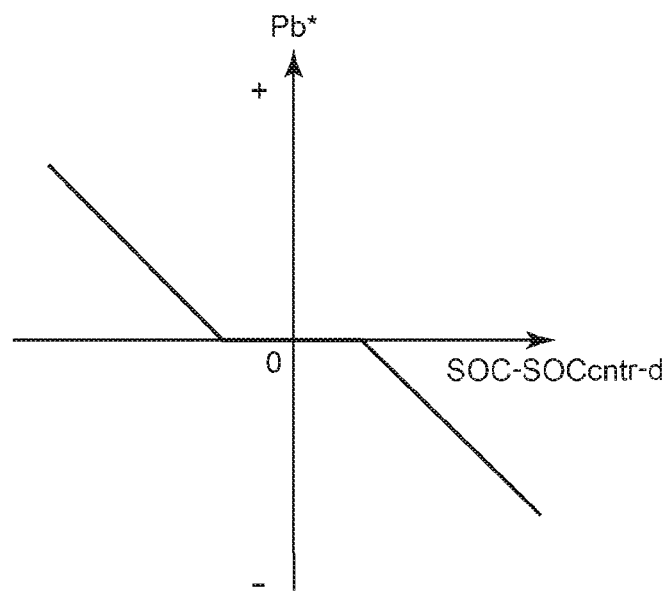

Subsequently, the PM ECU 70 proceeds to step 610, and determines whether downhill control is being executed. When downhill control is being executed in accordance with the downhill control routine shown in FIG. 5, the PM ECU 70 makes an affirmative determination in step 610, proceeds to step 615, and sets a lookup table MapPb*(SOC-SOCcntr-d) shown in FIG. 7A as a lookup table for determining a required battery charging output power Pb* (described later).

Subsequently, the PM ECU 70 proceeds to step 620, determines the required battery charging output power Pb* on the basis of the remaining amount of charge SOC, the first remaining amount of charge SOCcntr-d and the lookup table MapPb*(SOC-SOCcntr-d) set in step 615.

According to this table, when the difference (=SOC−SOCcntr-d) between the current remaining amount of charge SOC and the target remaining amount of charge (first remaining amount of charge) SOCcntr-d is a positive value (that is, when SOC>SOCcntr-d), the required charging output power Pb* becomes a negative value, so the required charging output power Pb* is determined such that the absolute value of the required charging output power Pb* increases as the absolute value of the difference (=SOC−SOCcntr-d) increases. On the other hand, when the difference (=SOC−SOCcntr-d) is a negative value (that is, when SOC<SOCcntr-d), the required charging output power Pb* becomes a positive value, and the required charging output power Pb* is determined such that the required charging output power Pb* increases as the difference (=SOC−SOCcntr-d) increases.

Figure 7B:
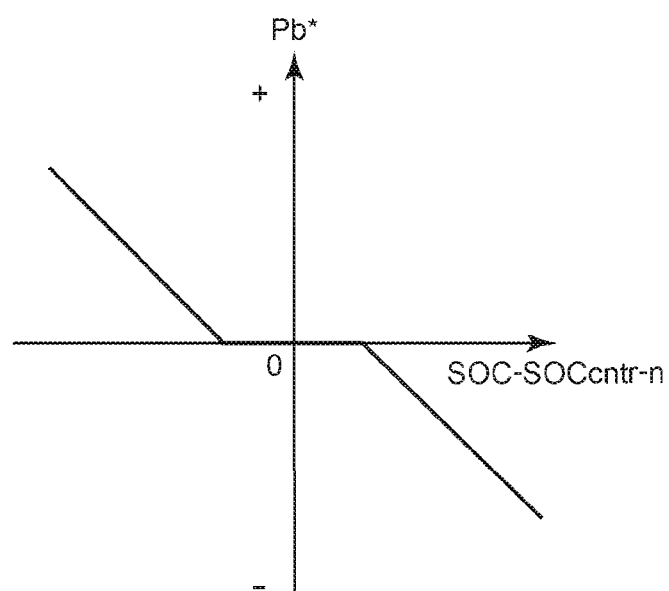

In contrast, when downhill control is not being executed, the PM ECU 70 makes a negative determination in step 610, proceeds to step 660, and sets a lookup table MapPb*(SOC-SOCcntr-n) shown in FIG. 7B as the lookup table for determining the required battery charging output power Pb*. This table is the same as the table shown in FIG. 7A except that the abscissa axis is different from the abscissa axis of FIG. 7A. After that, the PM ECU 70 proceeds to step 620, and determines the required battery charging output power Pb* on the basis of the remaining amount of charge SOC, the normal remaining amount of charge SOCcntr-n and the lookup table MapPb*(SOC-SOCcntr-n) set in step 660.

Incidentally, when the actual remaining amount of charge SOC is higher than the target remaining amount of charge SOCcntr, the required battery charging output power Pb* indicates a negative value. On the other hand, the normal remaining amount of charge SOCcntr-n is a value higher than the first remaining amount of charge SOCcntr-d. Thus, when the remaining amount of charge SOC is a predetermined (selected) value, the required battery charging output power Pb* decreases by a larger amount when the target remaining amount of charge SOCcntr is set to the first remaining amount of charge SOCcntr-d. That is, the required charging output power Pb* is smaller when downhill control is being executed than when downhill control is not being executed. As a result, when downhill control is being executed, the engine 20 is more difficult to be operated. In other words, the engine 20 is more easily operated when downhill control is not being executed than when downhill control is being executed.

Subsequently, the PM ECU 70 proceeds to step 625, and determines whether the remaining amount of charge SOC is higher than the lower limit remaining amount of charge SOClolmt. When the remaining amount of charge SOC is higher than the lower limit remaining amount of charge SOClolmt, the PM ECU 70 makes an affirmative determination in step 625, and directly proceeds to step 635. In contrast, when the remaining amount of charge SOC is lower than or equal to the lower limit remaining amount of charge SOClolmt, the PM ECU 70 makes a negative determination in step 625, proceeds to step 630, sets an extremely large value (a value larger than an engine start threshold Peth (described later)) for the required charging output power Pb*, and then proceeds to step 635.

In step 635, the PM ECU 70 calculates the sum of the required vehicle output power Pv*, the required charging output power Pb* and a loss (set value) Ploss as required engine output power Pe*.

Subsequently, the PM ECU 70 proceeds to step 640, and determines whether the required engine output power Pe* is larger than the engine start threshold Peth. The engine start threshold Peth is set to a value at which the internal combustion engine 20 is operated at an operation efficiency higher than a predetermined operation efficiency.

When the required engine output power Pe* is larger than the engine start threshold Peth, the PM ECU 70 makes an affirmative determination in step 640, proceeds to step 645, and determines whether the engine is stopped (the operation of the internal combustion engine 20 is stopped). When the engine is stopped, the PM ECU 70 proceeds to step 650, starts the internal combustion engine 20, and proceeds to step 655. In contrast, when the engine is not stopped, the PM ECU 70 directly proceeds from step 645 to step 655. In step 655, the PM ECU 70 controls the internal combustion engine 20 and the second generator motor MG2 (actually, the first generator motor MG1 as well) in accordance with a technique, and causes the vehicle 10 to travel by using output power from both the internal combustion engine 20 and the second generator motor MG2. That is, the vehicle 10 travels in hybrid mode.

On the other hand, when the required engine output power Pe* is smaller than or equal to the engine start threshold Peth, the PM ECU 70 makes a negative determination in step 640, proceeds to step 665, and determines whether the engine is in operation (the internal combustion engine 20 is in operation). When the engine is in operation, the PM ECU 70 proceeds to step 670, stops the operation of the internal combustion engine 20, and proceeds to step 675. In contrast, when the engine is not in operation, the PM ECU 70 directly proceeds from step 665 to step 675. In step 675, the PM ECU 70 controls the second generator motor MG2 in accordance with a technique, and causes the vehicle 10 to travel by using only the output power of the second generator motor MG2. That is, the vehicle 10 travels in motor mode (electric mode).

Regenerative Braking Control

When the accelerator (accelerator pedal) operation amount AP is zero, the PM ECU 70 determines required braking force that is required from the vehicle 10 on the basis of the operation amount BP of the brake pedal by executing a routine. The PM ECU 70 distributes the required braking force between required regenerative braking force and required friction braking force, controls the second generator motor MG2 such that the required regenerative braking force is generated through regenerative braking, and controls a hydraulic brake actuator such that the required friction braking force is generated by a friction brake device. The PM ECU 70 determines the required regenerative braking force such that the required regenerative braking force increases as much as possible within the range in which the remaining amount of charge SOC does not exceed the upper limit remaining amount of charge SOCuplmt.

Gradient Value Learning

Figure 8:
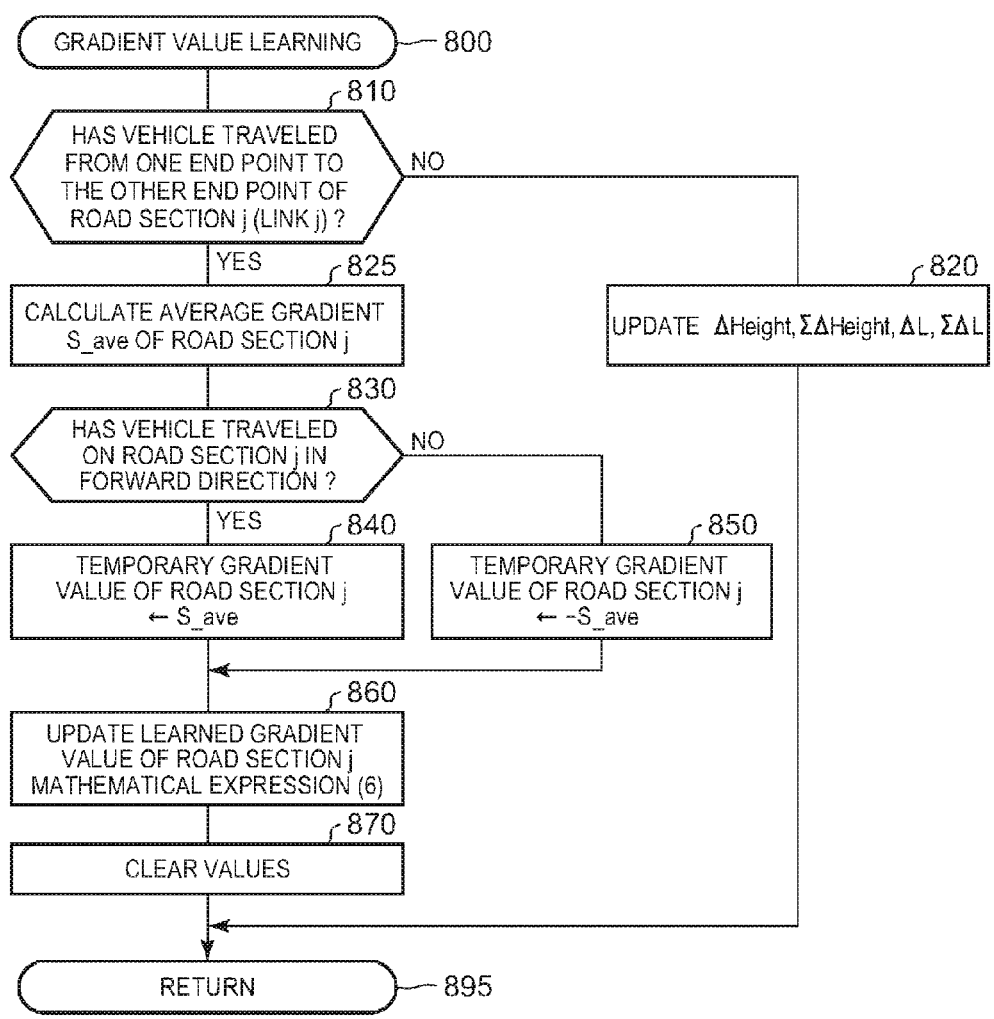
FIG. 8 is a flowchart that shows a gradient value learning routine that is executed by the CPU of the NV ECU of the hybrid vehicle shown in FIG. 1.

The NV ECU 74 (actually, the CPU) executes a gradient value learning routine (actual gradient information acquisition and learning routine) shown by the flowchart in FIG. 8 each time a predetermined time elapses. Therefore, the NV ECU 74 starts the process from step 800 at a predetermined timing, proceeds to step 810, and determines whether the vehicle 10 has traveled from one end point (a point corresponding to one node) of a road section j (a road section corresponding to a link) to the other end point (a point corresponding to the other node) of the road section.

When a negative determination is made in step 810, the NV ECU 74 proceeds to step 820, and updates a short section altitude difference ΔHeight, an altitude difference integrated value ΣΔHeight, a short section travel distance ΔL and a travel distance integrated value ΣΔL. A specific updating method for these values will be described later. After that, the NV ECU 74 directly proceeds to step 895, and once ends the routine.

When an affirmative determination is made in step 810, the NV ECU 74 proceeds to step 825, and calculates an average gradient S_ave of the passed road section j. This calculation method will also be described later. Subsequently, the NV ECU 74 proceeds to step 830, and determines whether the vehicle 10 has traveled on the road section j in the forward direction or in the reverse direction.

When the vehicle 10 has traveled on the road section in the forward direction, the NV ECU 74 proceeds to step 840, and stores the average gradient S_ave as a temporary gradient value of the road section j. In contrast, when the vehicle 10 has traveled on the road section j in the reverse direction, the NV ECU 74 proceeds to step 850, and stores a value obtained by inverting the sign of the average gradient S_ave (that is, −average gradient S_ave) as the temporary gradient value of the road section j.

After that, the NV ECU 74 proceeds to step 860, updates the learned gradient value of the road section j in accordance with the mathematical expression (6) (described later), and stores the updated learned gradient value in the travel data storage unit 89 in association with the road section j. That is, the gradient value of the road section j is learned. The NV ECU 74 calculates a learned altitude difference by multiplying the updated learned gradient value by the distance of the road section j, and also stores the learned altitude difference in the travel data storage unit 89 in association with the road section j. That is, the NV ECU 74 learns actual gradient information in step 860. Subsequently, the NV ECU 74 proceeds to step 870, clears the values (ΔHeight, ΣΔHeight, ΔL, ΣΔL, S_ave, and the like), proceeds to step 895, and once ends the routine.

Calculation of Average Gradient S_ave and Update of Learned Gradient Value

Next, calculation of the average gradient S_ave and update of the learned gradient value (that is, learning of a gradient value) that are performed by the NV ECU 74 will be described.

1. Calculation of Average Gradient S_ave

The NV ECU 74 initially computes a gradient acceleration (hereinafter also referred to as gradient resistance) G_slope on the basis of a resistance acceleration G_r (m/s$^2$) and a road load acceleration G_road (m/s$^2$) that are received while the vehicle 10 is traveling.

The NV ECU 74 computes the gradient resistance G_slope at each relatively short predetermined time or predetermined distance within the road section (that is, each time the vehicle 10 travels on a short section). That is, the NV ECU 74 calculates a plurality of gradient resistances G_slope at the time when the vehicle 10 is traveling on the road section.

Incidentally, the resistance acceleration G_r (m/s$^2$) may be expressed by the following mathematical expression (1).

$$G\_r = G\_fx + G\_vx + G\_\text{air} \quad (1)$$

In the mathematical expression (1), G_fx (m/s$^2$) is an estimated acceleration that is computed from the driving force Fx and weight M of the vehicle 10 (G_fx=Fx/M). G_vx (m/s$^2$) is an actual acceleration that is computed on the basis of a differential value dVx/dt of the vehicle speed. G_air (m/s$^2$) is an air resistance acceleration that is computed from the square of the vehicle speed (G_air=K·Vx$^2$ (K is constant)).

On the other hand, the resistance acceleration G_r that depends on a road surface is expressed as the sum of the gradient resistance G_slope and the road load acceleration G_road dependent on a road load (travel resistance) as expressed by the following mathematical expression (2).

$$G\_r = G\_\text{slope} + G\_\text{road} \quad (2)$$

The road load is resistance that arises in a path from a driving source to a road surface, and includes road surface resistance that arises in a path between the drive wheels 54 and the road surface, resistance that arises in a drive system that transmits driving force generated by the drive source, and the like.

Thus, the gradient resistance G_slope is expressed as the following mathematical expression (3) from the mathematical expression (1) and the mathematical expression (2).

$$G\_\text{slope} = G\_r - G\_\text{road} = G\_fx + G\_vx + G\_\text{air} - G\_\text{road} = Fx/M + dVx/dt + K^*Vx^2 - G\_\text{road} \quad (3)$$

The driving force Fx is, for example, calculated on the basis of the current engine rotation speed NE detected by a rotation speed sensor of the engine 20, included in the engine state quantity sensor 99, a current state of a speed stage of a transmission, detected by a shift position sensor, and the like. The driving force Fx may be calculated on the basis of the current accelerator operation amount detected by the accelerator operation amount sensor 82. The driving force Fx may be calculated by using separately calculated driving torque, regenerative braking torque, hydraulic braking torque, and the like.

The vehicle speed Vx is acquired from the vehicle speed sensor 84. The vehicle weight M, a constant, and the road load acceleration G_road are determined in advance, and are recorded in the ROM of the NV ECU 74. The NV ECU 74 is able to calculate the gradient resistance G_slope by substituting these values into the mathematical expression (3).

The NV ECU 74 calculates the short section altitude difference ΔHeight shown in the following mathematical expression (4) on the basis of the calculated gradient resistance G_slope.

$$\Delta\text{Height} = (G\_\text{slope}/9.8) \times \Delta L \quad (4)$$

ΔL denotes the short section travel distance of the vehicle 10, and is a value that is calculated by the product of the vehicle speed Vx and a sampling time Ts. Therefore, the NV ECU 74 calculates the average gradient S_ave of a link by dividing the altitude difference by a link length L. The altitude difference is the total sum of the short section altitude differences ΔHeight in the link.

$$S\_ave = \Sigma \Delta Height / L \quad (5)$$

2. Update of Learned Gradient Value

The NV ECU 74 updates the learned gradient value as follows in step 860 in FIG. 8. That is, when the NV ECU 74 proceeds to step 860, the NV ECU 74 calculates a new stored value (learned gradient value) S_ave_new by applying a stored value S_ave_m (last value of the learned gradient value) of the average gradient for the road section j stored in the travel data storage unit 89 and the gradient value S_ave of the road section j, obtained through the processes of step 825 to step 850, to the following mathematical expression (6).

$$S\_ave\_new = S\_ave \times \alpha + S\_ave\_m \times (1-\alpha) \quad (6)$$

α in the mathematical expression (6) is any positive constant that satisfies 0<α<1. However, when there is no last value, that is, when it is the first learning, a is set to "1".

The NV ECU 74 may calculate actual gradient information on the basis of an output value of an atmospheric pressure sensor included in the engine state quantity sensor 99. Specifically, the NV ECU 74 acquires the output value of the atmospheric pressure sensor at each end of a link, and calculates a gradient on the basis of the differential value and the length of the link.

As described above, when actual gradient information including a learned gradient value is stored in the travel data storage unit 89, the first apparatus acquires the actual gradient information as gradient information for searching for a target downhill section (step 420). When actual gradient information is not stored in the travel data storage unit 89, the first apparatus acquires measured gradient information including a navigation map gradient value as gradient information for searching for a target downhill section (step 440). As a result, it is possible to search for a target downhill section by using more highly accurate gradient information. Therefore, it is possible to execute downhill control on a proper section, so it is possible to sufficiently exercise the effect of improvement in fuel consumption.

Second Embodiment

A control apparatus (hereinafter, referred to as a second apparatus) for a hybrid vehicle according to a second embodiment of the disclosure differs from the first apparatus only in that, when a road section (a link ID assigned to a road section) stored in the NV DB 86 has been changed, actual gradient information including a learned gradient value corresponding to the road section is erased from the travel data storage unit 89.

Figure 9:
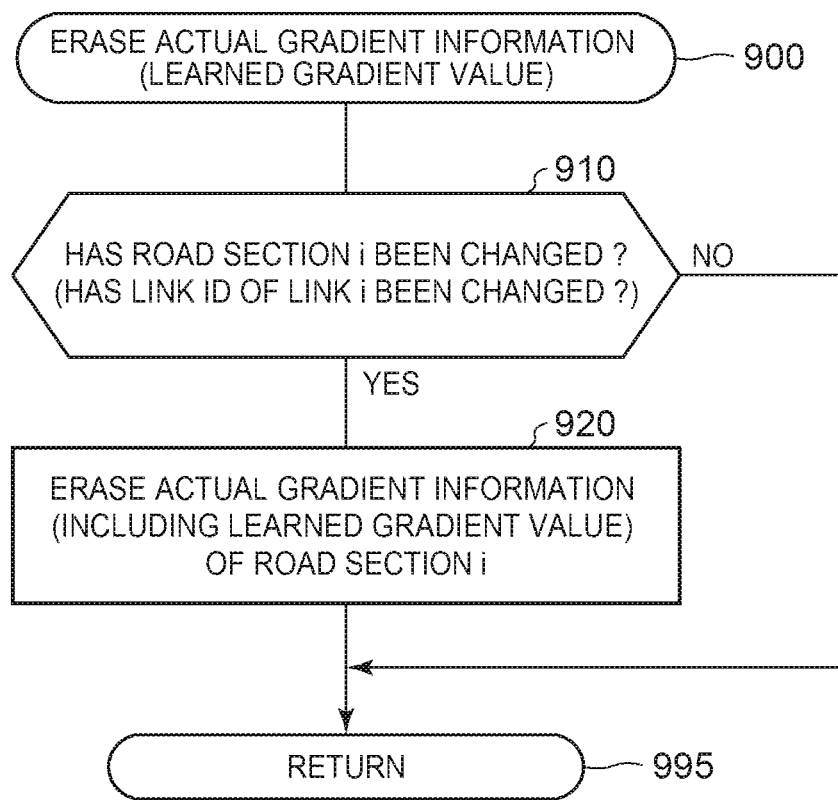
FIG. 9 is a flowchart that shows a learned gradient value erasing routine that is executed by a CPU of an NV ECU of a control apparatus according to a second embodiment of the disclosure.

More specifically, the NV ECU 74 of the second apparatus executes an actual gradient information erasing routine (learned gradient value erasing routine) shown by the flowchart in FIG. 9 in addition to the routines that are executed by the NV ECU 74 of the first apparatus. The actual gradient information erasing routine is executed each time a predetermined time elapses. Therefore, the NV ECU 74 starts the process from step 900 at predetermined timing, proceeds to step 910, and determines whether any road section i has been changed (that is, the link ID of a link i corresponding to the road section i has been changed). Such a change of a road section i and the map information of the changed road section i are, for example, transmitted from an external center, or the like, and received by a communication device provided in the NV ECU 74.

When a road section i has been changed, the NV ECU 74 makes an affirmative determination in step 910, proceeds to step 920, and erases the actual gradient information including the learned gradient value for the road section i. In contrast, when no road section i has been changed, the NV ECU 74 makes a negative determination in step 910, and once ends the routine.

For example, when new road information is added to the NV DB 86 in response to the fact that a new road is provided and, as a result, a road section that has been stored till then has been changed, the actual gradient information including the learned gradient value corresponding to the road section is no longer correct information. Therefore, in such a case, the second apparatus erases the actual gradient information so that the actual gradient information corresponding to the road section and stored in the travel data storage unit 89 is not used to search for a target downhill section. As a result, when a road section has been changed, the second apparatus is able to accurately perform a search for a downhill section, so it is possible to improve the fuel consumption performance of the vehicle.

As described above, the control apparatuses according to the embodiments of the disclosure further reliably provide the effect of improvement in fuel consumption resulting from downhill control. The disclosure is not limited to the above-described embodiments; various alternative embodiments may be employed within the scope of the disclosure. Such alternative embodiments will be listed below.

(1) The NV ECU 74 may execute the routine shown in FIG. 3 each time the vehicle 10 travels a predetermined distance.

(2) The PM ECU 70 may execute part or all of the routine shown in FIG. 3. In this case, the PM ECU 70 should acquire required information from the NV ECU 74.

(3) The PM ECU 70 may execute part or all of the routine shown in FIG. 8.

(4) The PM ECU 70 or the NV ECU 74 may detect passage of the vehicle 10 through the end point De of the controlled target section of downhill control when the gradient of a road becomes smaller than a predetermined gradient.

(5) The PM ECU 70 or the NV ECU 74 has been executing target remaining amount of charge decreasing control as downhill control from the start point Ds to the end point De of the controlled target section of downhill control. However, the target remaining amount of charge decreasing control may be executed only when the vehicle 10 is passing through the predeplete section or may be executed when the vehicle 10 is passing through the predeplete section and when the vehicle 10 is passing through a section from the start point Dk of the target downhill section to point Dp between the start point Dk and the end point De.

What is claimed is:

1. A control apparatus that is applied to a hybrid vehicle, the hybrid vehicle including an internal combustion engine that serves as a drive source of the hybrid vehicle, an electric motor that serves as a drive source of the hybrid vehicle, and a storage battery that supplies electric power to the electric motor, the hybrid vehicle being configured to perform regenerative braking with use of the electric motor and to charge the storage battery with electric power generated through the regenerative braking, the hybrid vehicle being also configured to charge the storage battery with electric power generated by using output power of the internal combustion engine, the control apparatus being configured to control the internal combustion engine and the electric motor such that a required driving force that is required from the hybrid vehicle is satisfied and a remaining amount of charge of the storage battery approaches a target remaining amount of charge set to a normal remaining amount of charge, the control apparatus comprising:

first storage means for storing map information;

scheduled route determination means for determining a scheduled travel route from a current location of the hybrid vehicle to a destination on the basis of the map information;

controlled section determination means for searching for a target downhill section that satisfies a predetermined condition within the scheduled travel route on the basis of measured gradient information pertaining to a gradient and stored in the first storage means for each road section that constitutes the scheduled travel route, and, when there is the target downhill section, determining, within a section from a downhill control start point that is located a predetermined first distance from a start point of the target downhill section to an end point of the target downhill section, a controlled section including at least a section from the downhill control start point to the start point of the target downhill section;

control execution means for, when the hybrid vehicle travels on the controlled section, executing downhill control in which the target remaining amount of charge is changed to a first remaining amount of charge lower than the normal remaining amount of charge;

gradient information acquisition means for, when the hybrid vehicle has traveled on a road section, acquiring actual gradient information pertaining to an actual gradient of the road section with use of a sensor provided in the hybrid vehicle; and second storage means for storing the actual gradient information in association with the road section, wherein the controlled section determination means is configured to, when the actual gradient information of the road section that constitutes the scheduled travel route is stored in the second storage means in a case of searching for the target downhill section, search for the target downhill section by using the actual gradient information instead of the measured gradient information for the road section of which the actual gradient information is stored.

2. The control apparatus according to claim 1, further comprising:

erasing means for, when the road section in the map information has been changed, erasing the actual gradient information corresponding to the changed road section from the second storage means.

3. A control apparatus that is applied to a hybrid vehicle, the hybrid vehicle including an internal combustion engine that serves as a drive source of the hybrid vehicle, an electric motor that serves as a drive source of the hybrid vehicle, and a storage battery that supplies electric power to the electric motor, the hybrid vehicle being configured to perform regenerative braking with use of the electric motor and to charge the storage battery with electric power generated through the regenerative braking, the hybrid vehicle being also configured to charge the storage battery with electric power generated by using output power of the internal combustion engine, the control apparatus being configured to control the internal combustion engine and the electric motor such that a required driving force that is required from the hybrid vehicle is satisfied and a remaining amount of charge of the storage battery approaches a target remaining amount of charge set to a normal remaining amount of charge, the control apparatus comprising:

a first storage device to store map information;

a first electronic controller configured to determine a scheduled travel route from a current location of the hybrid vehicle to a destination on the basis of the map information, the first electronic controller being configured to search for a target downhill section that satisfies a predetermined condition within the scheduled travel route on the basis of measured gradient information pertaining to a gradient and stored in the first storage device for each road section that constitutes the scheduled travel route, and, when there is the target downhill section, determine, within a section from a downhill control start point that is located a predetermined first distance from a start point of the target downhill section to an end point of the target downhill section, a controlled section including at least a section from the downhill control start point to the start point of the target downhill section, and the first electronic controller being configured to, when the hybrid vehicle has traveled on a road section, acquire actual gradient information pertaining to an actual gradient of the road section from a sensor provided in the hybrid vehicle;

a second electronic controller configured to, when the hybrid vehicle travels on the controlled section, execute downhill control in which the target remaining amount of charge is changed to a first remaining amount of charge lower than the normal remaining amount of charge; and a second storage device to store the actual gradient information in association with the road section, wherein the first electronic controller is configured to, when the actual gradient information of the road section that constitutes the scheduled travel route is stored in the second storage device in a case of searching for the target downhill section, search for the target downhill section by using the actual gradient information instead of the measured gradient information for the road section of which the actual gradient information is stored.

4. The control apparatus according to claim 3, wherein the first electronic controller is configured to, when the road section in the map information has been changed, erase the actual gradient information corresponding to the changed road section from the second storage device.

5. A control apparatus that is applied to a hybrid vehicle, the hybrid vehicle including an internal combustion engine that serves as a drive source of the hybrid vehicle, an electric motor that serves as a drive source of the hybrid vehicle, and a storage battery that supplies electric power to the electric motor, the hybrid vehicle being configured to perform regenerative braking with use of the electric motor and to charge the storage battery with electric power generated through the regenerative braking, the hybrid vehicle being also configured to charge the storage battery with electric power generated by using output power of the internal combustion engine, the control apparatus being configured to control the internal combustion engine and the electric motor such that a required driving force that is required from the hybrid vehicle is satisfied and a remaining amount of charge of the storage battery approaches a target remaining amount of charge set to a normal remaining amount of charge, the control apparatus comprising:

a first memory to store map information;

circuitry configured to:

determine a scheduled travel route from a current location of the hybrid vehicle to a destination on the basis of the map information, the circuitry being configured to search for a target downhill section that satisfies a predetermined condition within the scheduled travel route on the basis of measured gradient information pertaining to a gradient and stored in the first memory for each road section that constitutes the scheduled travel route, and, when there is the target downhill section, determine, within a section from a downhill control start point that is located a predetermined first distance from a start point of the target downhill section to an end point of the target downhill section, a controlled section including at least a section from the downhill control start point to the start point of the target downhill section, and the circuitry being configured to, when the hybrid vehicle has traveled on a road section, acquire actual gradient information pertaining to an actual gradient of the road section from a sensor provided in the hybrid vehicle, and when the hybrid vehicle travels on the controlled section, execute downhill control in which the target remaining amount of charge is changed to a first remaining amount of charge lower than the normal remaining amount of charge; and a second memory to store the actual gradient information in association with the road section, wherein the circuitry is configured to, when the actual gradient information of the road section that constitutes the scheduled travel route is stored in the second memory in a case of searching for the target downhill section, search for the target downhill section by using the actual gradient information instead of the measured gradient information for the road section of which the actual gradient information is stored.

6. The control apparatus according to claim 5, wherein the circuitry is configured to, when the road section in the map information has been changed, erase the actual gradient information corresponding to the changed road section from the second memory.

* * * * *